(12) United States Patent
Aizenshtein

(10) Patent No.: US 11,935,194 B2
(45) Date of Patent: Mar. 19, 2024

(54) CONSTRAINED BSDF SAMPLING

(71) Applicant: NVIDIA Corporation, Santa Clara, CA (US)

(72) Inventor: Maksim Aizenshtein, Sammamish, WA (US)

(73) Assignee: NVIDIA Corporation, Santa Clara, CA (US)

( * ) Notice: Subject to any disclaimer, the term of this patent is extended or adjusted under 35 U.S.C. 154(b) by 53 days.

(21) Appl. No.: 17/548,038

(22) Filed: Dec. 10, 2021

(65) Prior Publication Data

US 2022/0189114 A1 Jun. 16, 2022

Related U.S. Application Data

(60) Provisional application No. 63/125,315, filed on Dec. 14, 2020.

(51) Int. Cl.
*G06T 17/20* (2006.01)
*G06T 15/00* (2011.01)
(Continued)

(52) U.S. Cl.
CPC ............ *G06T 17/20* (2013.01); *G06T 15/005* (2013.01); *G06T 15/06* (2013.01); *G06T 15/30* (2013.01); *G06T 15/50* (2013.01)

(58) Field of Classification Search
None
See application file for complete search history.

(56) References Cited

U.S. PATENT DOCUMENTS

| 5,936,633 A * | 8/1999 | Aono | G06T 15/50 |
| | | | 345/589 |
| 2011/0043522 A1 * | 2/2011 | Zhou | G06T 15/506 |
| | | | 345/426 |

(Continued)

FOREIGN PATENT DOCUMENTS

WO WO-2019183149 A1 * 9/2019 ............. G06T 15/06

OTHER PUBLICATIONS

Lecocq et al., "Analytic Approximations for Real-Time Area Light Shading," May 2017, IEEE Transactions on Visualization and Computer Graphics, vol. 23, No. 5, 1428-1441 (Year: 2017).*

(Continued)

*Primary Examiner* — Andrew G Yang
(74) *Attorney, Agent, or Firm* — Leydig, Voit & Mayer, Ltd.

(57) ABSTRACT

Systems and methods are provided to perform constrained BSDF sampling in relation to various algorithms, and specifically in relation to ray tracing algorithms. In some embodiments, a method is provided to generate samples by: determining a spherical polygon on a unit hemisphere; determining, on a unit circle, a projected area corresponding to the spherical polygon on the unit hemisphere; determining a parameterization of the projected area of the spherical polygon on the unit circle; generating samples in the projected area based on the parameterization; and generating samples in the spherical polygon. The unit circle is abase of the unit hemisphere, and the projection of the projected area is along a vector perpendicular to the unit circle. The generated samples in the spherical polygon correspond to the samples in the projected area. The method may further include evaluating a rendering equation based on the generated samples in the spherical polygon.

20 Claims, 16 Drawing Sheets

(51) Int. Cl.
*G06T 15/06* (2011.01)
*G06T 15/30* (2011.01)
*G06T 15/50* (2011.01)

(56) References Cited

U.S. PATENT DOCUMENTS

2014/0218362 A1* 8/2014 Gindele ............... A61B 6/5205
  345/424
2021/0081490 A1* 3/2021 Martinez Cortes ... G06F 9/3887

OTHER PUBLICATIONS

Diolatzis et al., "Practical Product Path Guiding Using Linearly Transformed Cosines," Jul. 2020, Computer Graphics Form, vol. 39, Issue 4, pp. 23-33 (Year: 2020).*

* cited by examiner

CONSTRAINED BSDF SAMPLING

CROSS-REFERENCE TO RELATED APPLICATION

This application claims priority to U.S. Provisional Application No. 63/125,315, filed on Dec. 14, 2020, the disclosure of which is hereby incorporated by reference in its entirety.

BACKGROUND

Ray tracing techniques are widely used in computer graphics to render images. In some instances, a rendering equation is used to perform realistic image synthesis. The rendering equation describes a total amount of light emitted from a point along a particular viewing angle. Every physical effect of light flow may be described in the rendering equation, such as reflection, refraction, scattering and diffusion. When the rendering equation is fully implemented, a true color of the emitted light from the point may be obtained. However, such implementation may not be feasible, due to the complexity of the equation and the requirement for large computational resources.

Instead of directly solving the integral in the rendering equation analytically, an estimate of the solution can be generated using Monte Carlo methods to solve the rendering equation. In some techniques, the integrand of the rendering equation may be evaluated by applying sampling functions. Choice of a sampling method may affect efficiency, accuracy and complexity of the evaluation. Commonly used light sampling methods include area sampling, solid angle sampling, and cosine weighted sampling.

Area sampling produces sufficiently good results for light that occupies a small solid angle. Implementation of area sampling is trivial, and area sampling is flexible including the ability to integrate the use of importance sampling using textures. However, sample quality deteriorates quickly as the solid angle of the light becomes large, due to variance in the geometric factor.

Solid angle sampling produces samples that are distributed evenly over the solid angle of the light. Therefore, solid angle sampling significantly improves quality compared to area sampling for a light source associated with larger solid angles. Implementation of solid angle sampling is reasonably complex, and the sampling method is well suited for taking multiple samples. However, importance sampling using textures is not typically implemented when using solid angle sampling techniques. Compared to area sampling, a computational cost of solid angle sampling is higher. When the range of the solid angle to be sampled is very small, solid angle sampling will generate similar results as area sampling but with a much higher computational cost.

Cosine weighted sampling is an improvement over solid angle sampling in terms of generating a denser distribution of samples in the area with most contribution to the final solution. By applying cosine weighted sampling, precise lighting values can be derived using a Lambertian bidirectional scattering density function (BSDF). However, cosine weighted sampling is even more complex than solid angle sampling. Implementation of the sampling method may be very difficult and require clipping lights against the horizon.

Each of these techniques suffers from certain limitations. Some techniques may be easier to compute, but the noise in the result may be unsuitable. Other techniques may result in less noise, but the solution is much more complex, limiting the implementation in real-time rendering applications.

Thus, there is a need for improving sampling techniques for use, among other applications, in rendering algorithms.

SUMMARY

A constrained BSDF sampling method is disclosed herein to generate samples for a spherical polygon with a cosine weighted distribution. In an embodiment, the spherical polygon is projected to a unit circle. Sampling of the projected area on the unit circle is equivalent to sampling of the spherical polygon on a unit hemisphere. In another embodiment, a rejection-based sampling approach may be applied to accept or reject samples.

In accordance with a first aspect of the present disclosure, a method for generating samples includes: determining a spherical polygon on a unit hemisphere; determining, on a unit circle, a projected area corresponding to the spherical polygon on the unit hemisphere; determining a parameterization of the projected area of the spherical polygon on the unit circle; generating samples in the projected area based on the parameterization; and generating samples in the spherical polygon. The unit circle is a base of the unit hemisphere, and the projection of the projected area is along a vector perpendicular to the unit circle. The generated samples in the spherical polygon correspond to the samples in the projected area.

In accordance with an embodiment, an origin of the unit hemisphere is a point on a surface of an object, and the base of the unit hemisphere is perpendicular to a surface normal of the point on the surface of the object.

In accordance with an embodiment, the spherical polygon on the unit hemisphere is determined by intercepting rays from a polygonal area light with the unit hemisphere, and the rays are determined by connecting vertices of the polygonal area light to the origin of the unit hemisphere.

In accordance with an embodiment, the polygonal area light is partially below a horizon of the unit hemisphere. The method further includes: clipping the polygonal area light at the horizon of the unit hemisphere; and dividing the clipped polygonal area light to generate a number of triangles.

In accordance with an embodiment, the projected area of the spherical polygon on the unit circle is bounded by a set of ellipses. The set of ellipses share an origin at the origin of the unit circle, and the set of ellipses corresponds to a set of great circles on the unit hemisphere.

In accordance with an embodiment, the method further includes: evaluating a rendering equation based on the generated samples in the spherical polygon.

In accordance with a second aspect of the present disclosure, a method for generating samples includes: generating a sample on a unit hemisphere; checking the sample against an acceptance criterion; and in response to the sample meeting the acceptance criterion, adding the sample to a set of samples; or in response to the sample not meeting the acceptance criterion, rejecting the sample. The acceptance criterion comprises an acceptance probability related to a height of the sample on the unit hemisphere relative to a maximum height of a spherical polygon.

In accordance with an embodiment, the acceptance criterion is met responsive to determining that a randomly or pseudo randomly generated value is greater than or equal to the acceptance probability.

In accordance with an embodiment, the sample is generated in accordance with a uniform distribution on the unit hemisphere.

In accordance with an embodiment, a pole of the unit hemisphere is not included in the spherical polygon. The method further includes: determining the maximum height of the spherical polygon among vertices and edges of the spherical polygon.

In accordance with an embodiment, the method further includes: evaluating a rendering equation based on the set of samples in the spherical polygon.

In accordance with a third aspect of the present disclosure a system is provided for generating samples. The system includes: one or more processors; and a memory storing instructions. The instructions, responsive to execution by the one or more processors, cause the system to: determine a spherical polygon on a unit hemisphere; determine, on a unit circle, a projected area corresponding to the spherical polygon on the unit hemisphere; determine a parameterization of the projected area of the spherical polygon on the unit circle; generate samples in the projected area based on the parameterization; and generate samples in the spherical polygon. The unit circle is a base of the unit hemisphere, and the projection of the projected area is along a vector perpendicular to the unit circle. The generated samples in the spherical polygon correspond to the samples in the projected area.

In accordance with an embodiment, an origin of the unit hemisphere is a point on a surface of an object, and the base of the unit hemisphere is perpendicular to a surface normal of the point on the surface of the object.

In accordance with an embodiment, the spherical polygon on the unit hemisphere is determined by intercepting rays from a polygonal area light with the unit hemisphere, and the rays are determined by connecting vertices of the polygonal area light to the origin of the unit hemisphere.

In accordance with an embodiment, the polygonal area light is partially below a horizon of the unit hemisphere. The instructions further cause the system to: clip the polygonal area light at the horizon of the unit hemisphere; and divide the clipped polygonal area light to generate a number of triangles.

In accordance with an embodiment, the projected area of the spherical polygon on the unit circle is bounded by a set of ellipses. The set of ellipses share an origin at the origin of the unit circle, and the set of ellipses corresponds to a set of great circles on the unit hemisphere.

In accordance with an embodiment, the instructions further cause the system to: evaluate a rendering equation based on the generated samples in the spherical polygon.

In accordance with an embodiment, the spherical polygon is transformed from an original space based on a linearly transformed cosines (LTC) matrix. The instructions further cause the system to: transform the generated samples in the spherical polygon back to the original space based on the LTC matrix.

In accordance with a fourth aspect of the present disclosure, a non-transitory computer readable medium is provided that stores instructions. The instructions, responsive to execution by one or more processors, cause a system to implement the method according to the first aspect.

BRIEF DESCRIPTION OF THE DRAWINGS

The present systems and methods for constrained BSDF sampling are described in detail below with reference to the attached drawing figures.

DETAILED DESCRIPTION

Systems and methods are disclosed related to constrained BSDF sampling. A constrained BSDF sampling method is provided to generate samples for a spherical polygon with a cosine weighted distribution. The spherical polygon may be projected to a unit circle, where the spherical polygon and the projected area on the unit circle are isometric. Hence, sampling of the projected area on the unit circle is equivalent to sampling of the spherical polygon on a unit hemisphere. The projected area on the unit circle may be bounded by a set of ellipses that share an origin at the origin of the unit circle. Therefore, density functions of angular coordinates and radial coordinates for the projected area may be calculated based on the arcs of the ellipses. As used herein, a unit circle refers to a circle located on a plane, where the circle has a radius of one unit. The unit may be the units of a coordinate system used for the samples. Similarly, a unit hemisphere refers to a hemisphere having a radius of one unit. Finally, a spherical polygon is a polygon on a surface of a sphere (or hemisphere) defined by a number of great circle arcs, which are defined by the intersection of the surface with a plane passing through the center of the sphere.

In some embodiments, a rejection-based sampling approach may be applied to accept or reject samples. In the rejection approach, a sample is generated and then checked against acceptance criteria. If the sample meets the acceptance criteria, then the sample is added to a set of samples. However, if the sample fails to meet the acceptance criteria, then the sample is rejected and a new sample is generated. The acceptance criteria is related to a height of the sample on the unit hemisphere relative to a maximum height of the spherical polygon (e.g., the max z value relative to the base of the unit hemisphere within the spherical polygon). Samples are accepted with a probability equal to the acceptance criteria, such that the resulting accepted samples within the spherical polygon may have a cosine weighted distribution.

Figure 1A:
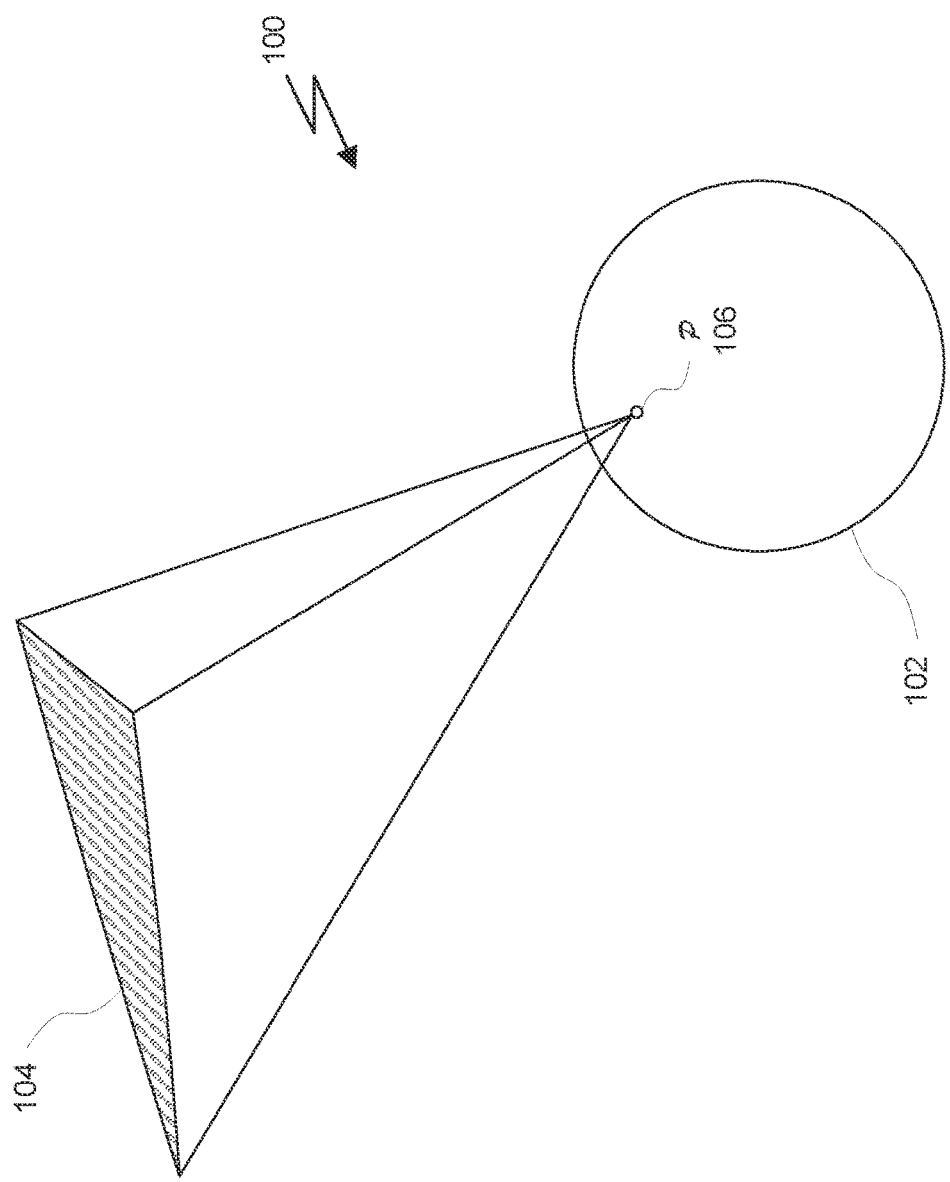
FIG. 1A illustrates an area light illuminating a random point P on the surface of an object, in accordance with some embodiments.

FIG. 1A illustrates an area light 104 illuminating an object 102, in accordance with some embodiments. A point P 106 is located on the surface of object 102. Rays incident from area light 104 to point P 106 contribute to the color of point P 106. Area light 104 may be of any polygonal shape. For example, area light 104 as depicted in FIG. 1A may have a triangular shape and three vertices. Edge rays that come from the edges of area light 104 are illustrated as rays from the three vertices of area light 104 to point P 106. Rays within the region defined by the edge rays may be evaluated for calculating the color of point P 106.

Figure 1B:
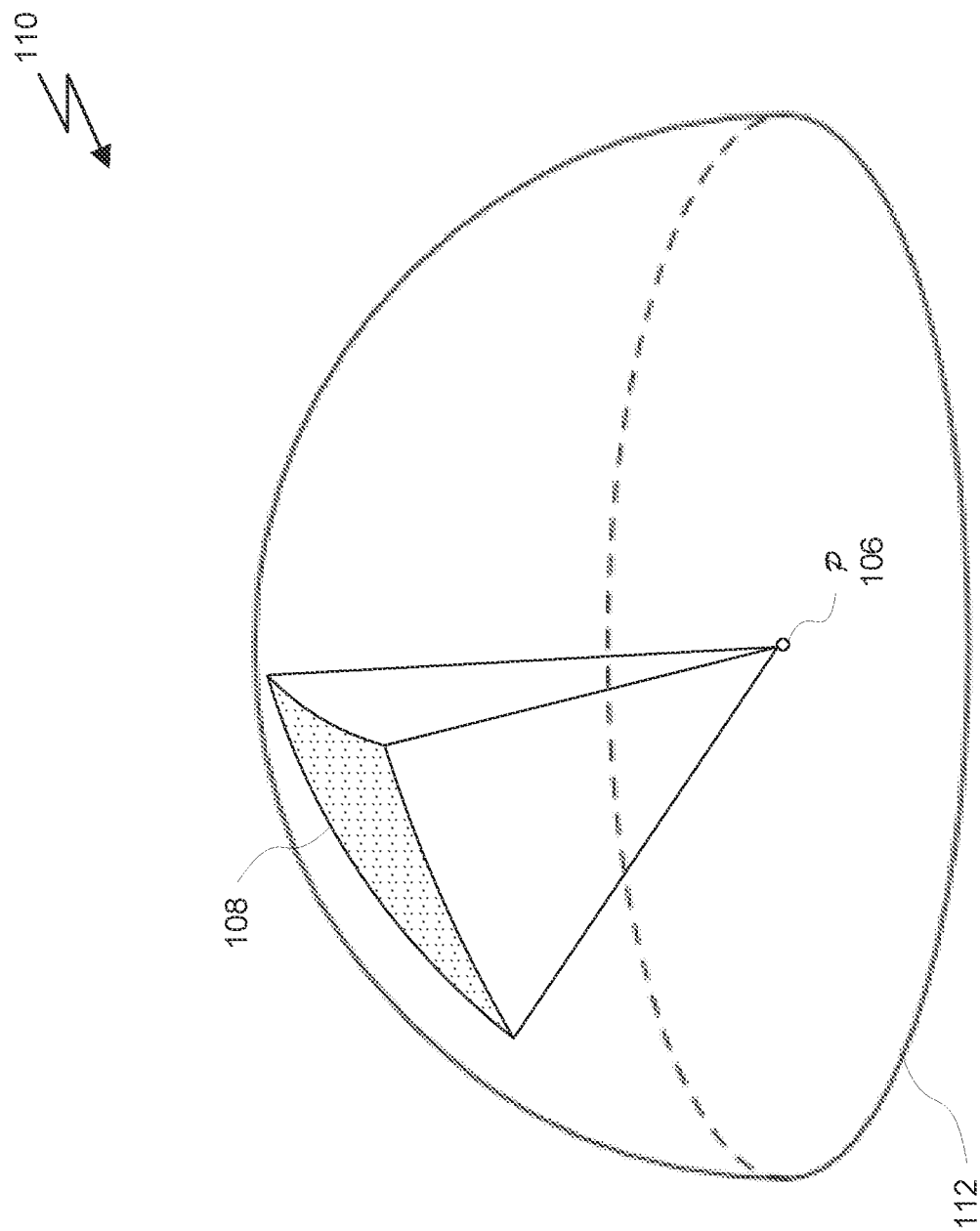
FIG. 1B illustrates a spherical polygon projected on a unit hemisphere centered at point P, in accordance with some embodiments.

FIG. 1B illustrates a spherical polygon 108 projected on a unit hemisphere 110 centered at point P 106, in accordance with some embodiments. Unit hemisphere 110 is defined at point P 106, where point P 106 is the origin of the unit hemisphere. The base of the hemisphere is a unit circle 112 and is perpendicular to the normal vector on object 102 of FIG. 1A at point P 106. The edge rays from area light 104 intersect with unit hemisphere 110, which results in a projected spherical triangle 108 on the surface of unit hemisphere 110. All rays incident from area light 104 to point P 106 pass through spherical triangle 108 on the surface of unit hemisphere 110. According to the unit hemisphere at point P, emitted light from point P may be calculated by a rendering equation, $$\int_\Omega d\omega_i L_i f_{BSDF} \cdot \langle \omega_g, \omega_i \rangle, \quad \text{(Eq. 1)}$$

where $\omega_i$ is the negative direction of the incoming light. $\omega_g$ is the geometric (or macro) normal vector of the surface at point P 106, $\Omega$ is the unit hemisphere centered at point P 106 and containing all possible values for $\omega_i$, $f_{BSDF}$ is the bidirectional scattering distribution function (BSDF), which represents the proportion of light reflected from $\omega_i$ to a given angle at position P, and $L_i$ is the incident light coming toward point P 106 from direction $\omega_i$, $\langle \omega_g, \omega_i \rangle$ is the weakening factor of outward irradiance due to incident angle $\theta$, and $\langle \omega_g, \omega_i \rangle = \cos \theta$ according to Lambert's cosine law.

Equation 2, shown below, is the BSDF for Lambertian materials, which is a constant:

$$f_{BSDF} = \frac{\rho}{\pi}, \quad \text{(Eq. 2)}$$

where $\rho$ is the hemispherical reflectivity.

For a single non-textured area light, Equation 1 becomes a cosine integral over a spherical polygon:

$$\int_\Omega d\omega_i L_i \cdot \frac{\rho}{\pi} \cdot \cos \theta, \quad \text{(Eq. 3)}$$

where $\langle \omega_g, \omega_i \rangle = \cos \theta$.

When the area light is a triangle and the triangle is not fully above the horizon of the unit hemisphere, then the problem may be solved by clipping the triangle at the horizon and dividing the clipped area light as up to two triangles with a total number of four vertices. When the area light is a quad, the area light may be divided up into two triangles or, if a portion of the area light is below the horizon, then the area light may be divided up into up to three triangles with a total number of five vertices.

Without shadowing, Equation 3 is known as Lambert's integral and can be evaluated analytically. However, with shadowing (i.e., where objects can occlude a portion of the area light from point P 106), the integral may be evaluated by applying sampling methods. In one embodiment, an inversion method may be applied to generate samples with cosine weighted distribution on spherical polygon 108. In another embodiment, a rejection-based method with defined acceptance criteria may be applied to generate samples with desired distribution on spherical polygon 108.

According to an embodiment of the inversion method, a sampling probability density function (PDF) is selected such that only constant factors remain after dividing by the sampling PDF. The PDF to sample from is expressed as:

$$f_{\omega_i} = \frac{\langle \omega_g, \omega_i \rangle}{N} \cdot 1\{\omega_i \in ST\} = \frac{\cos \theta}{N} \cdot 1\{\omega_i \in ST\}, \quad \text{(Eq. 4)}$$

where ST is the spherical triangle, and N is the value of Lambert's integral.

There's no known way to sample from $f_{\omega_i}$ directly. However, the points on unit hemisphere 110 can be parameterized in polar coordinates $\theta$, $\varphi$. Consider a metric tensor expressed as:

$$g_{ij} = \begin{pmatrix} \cos^2\theta & 0 \\ 0 & \sin^2\theta \end{pmatrix} \quad \text{(Eq. 5)}$$

The corresponding area element of the metric is:

$$\sqrt{\det g_{ij}} = \cos \theta \cdot \sin \theta \quad \text{(Eq. 6)}$$

An embedding of the manifold into $\mathbb{R}^3$ becomes:

$$h(\theta,\varphi) = (\sin \theta \cos \varphi, \sin \theta \sin \varphi, 0)^T \quad \text{(Eq. 7)}$$

Equation 7 represents a projection of the points on spherical hemisphere 110 onto the x-y plane of unit circle 112.

On the other hand, a cosine weighted spherical triangle may be embedded, by transforming $f_{\omega_i}$ to polar coordinates. Equation 4 then becomes:

$$f_{\theta,\varphi} = \frac{\cos \theta \cdot \sin \theta}{N} \cdot 1\{\omega_i \in ST\} \quad \text{(Eq. 8)}$$

Figure 1C:
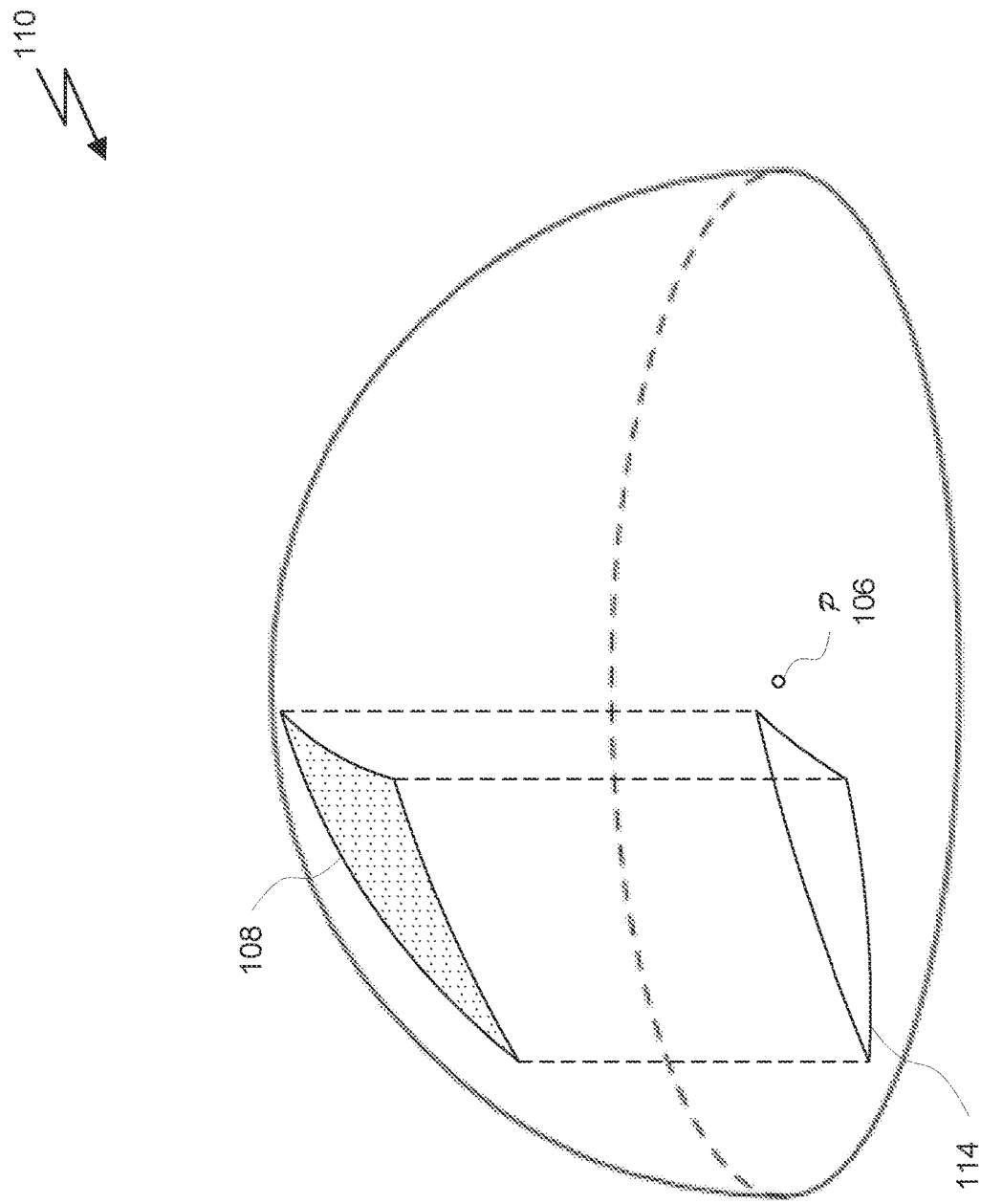
FIG. 1C illustrates the spherical polygon projected on a unit circle corresponding to the unit hemisphere, in accordance with some embodiments.

Therefore, when the distribution of samples over unit hemisphere 110 is cosine weighed, spherical triangle 108 may be further projected to unit circle 112 of unit hemisphere 110 as a projected area 114, as illustrated in FIG. 1C. Sampling spherical triangle 108 is equivalent to sampling projected area 114 on unit circle 112.

Figure 1D:
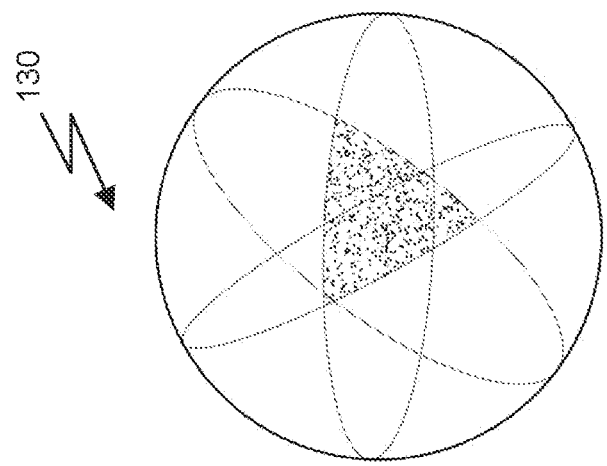
FIGS. 1D-1F illustrate three cases of a projected area on the unit circle bound by a set of ellipses, in accordance with some embodiments.
Figure 1E:
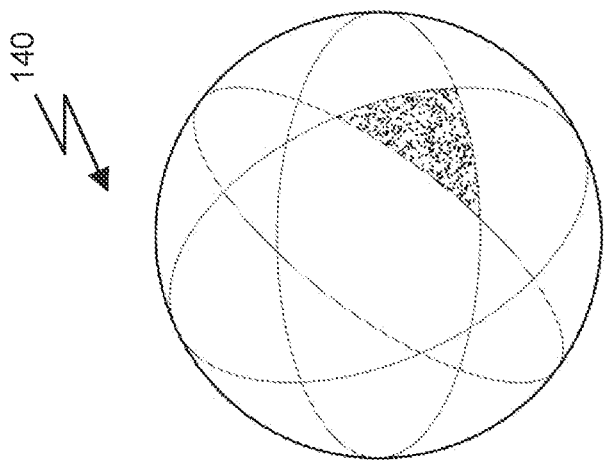
Figure 1F:
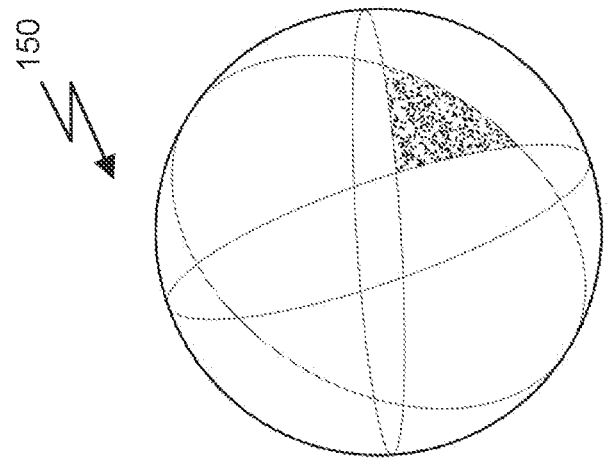

Spherical triangle 108 on unit hemisphere 110 may be bounded by a set of great circles. The set of the great circles, when projected onto unit circle 112, become a set of ellipses that share an origin at point P 106. Projected area 114 on unit circle 112 are bounded by the set of projected ellipses. FIGS. 1D-1F illustrates three cases of a projected area bounded by a set of ellipses. As shown in FIG. 1D, the projected area may be enclosed by all three ellipses. As shown in FIG. 1E, the projected area may be enclosed by two ellipses and bordered by the third. As shown in FIG. 1F, the projected area may be enclosed by one ellipse and bordered by two ellipses.

The bounding curves on unit hemisphere 110 are given in implicit form:

$$\begin{cases} Ax + By + Cz = 0 \\ x^2 + y^2 + z^2 = 1 \end{cases} \tag{Eq. 9}$$

A, B and C have a relationship of:

$$(A, B, C) = \frac{v_{i+1} \times v_i}{\|v_{i+1} \times v_i\|} \tag{Eq. 10}$$

Therefore, each great circle projected onto unit circle 112 of FIG. 1B has the following expression:

$$x^2 + y^2 + \left(\frac{Ax + By}{C}\right)^2 = 1 \tag{Eq. 11}$$

Each ellipse has a center at the origin of the unit circle. An interior of the ellipse may be parametrized in polar coordinates as:

$$\begin{pmatrix} x \\ y \end{pmatrix} = L^{-1} \begin{pmatrix} R\cos\phi \\ R\sin\phi \end{pmatrix}, \tag{Eq. 12}$$

where R is radial coordinate and $\phi$ is angular coordinate in polar coordinates, generally $R \in [0,1]$ and $\phi \in [0,2\pi]$. L is given by Cholesky decomposition of the ellipse's implicit equation in Equation 11, as expressed via a matrix:

$$L = \begin{pmatrix} \frac{\sqrt{A^2 + C^2}}{|C|} & \frac{AB}{|C|\sqrt{A^2 + C^2}} \\ 0 & \frac{1}{\sqrt{A^2 + C^2}} \end{pmatrix} \tag{Eq. 13}$$

When R=1, bounds of $\phi$ may be determined by solving the equation system in 12, which can be rewritten as:

$$L\begin{pmatrix} x \\ y \end{pmatrix} = \begin{pmatrix} \cos\phi \\ \sin\phi \end{pmatrix} \tag{Eq. 14}$$

By combining Equations 13 and 14, $\phi$ may be written as:

$$\phi = \arg\left(x\frac{\sqrt{A^2 + C^2}}{|C|} + y\frac{AB}{|C|\sqrt{A^2 + C^2}} + i \cdot \frac{y}{\sqrt{A^2 + C^2}}\right) \tag{Eq. 15}$$

Equation 15 may be applied to determine bounds of $\phi$.

A lower bound on R is denoted as $R_0$. $R_0$ may be determined by solving:

$$R_0 L^{-1} \begin{pmatrix} \cos\phi \\ \sin\phi \end{pmatrix} = L_{in}^{-1} \begin{pmatrix} \cos\phi_{in} \\ \sin\phi_{in} \end{pmatrix} \tag{Eq. 16}$$

where $L_{in}$ is the matrix form of the inner ellipse that bounds the minimum value of R at the angle $\phi$.

Depending on whether the origin of unit circle 112 is inside the projected area of the spherical triangle on unit circle 112, calculations may have different complexities.

Figure 3A:
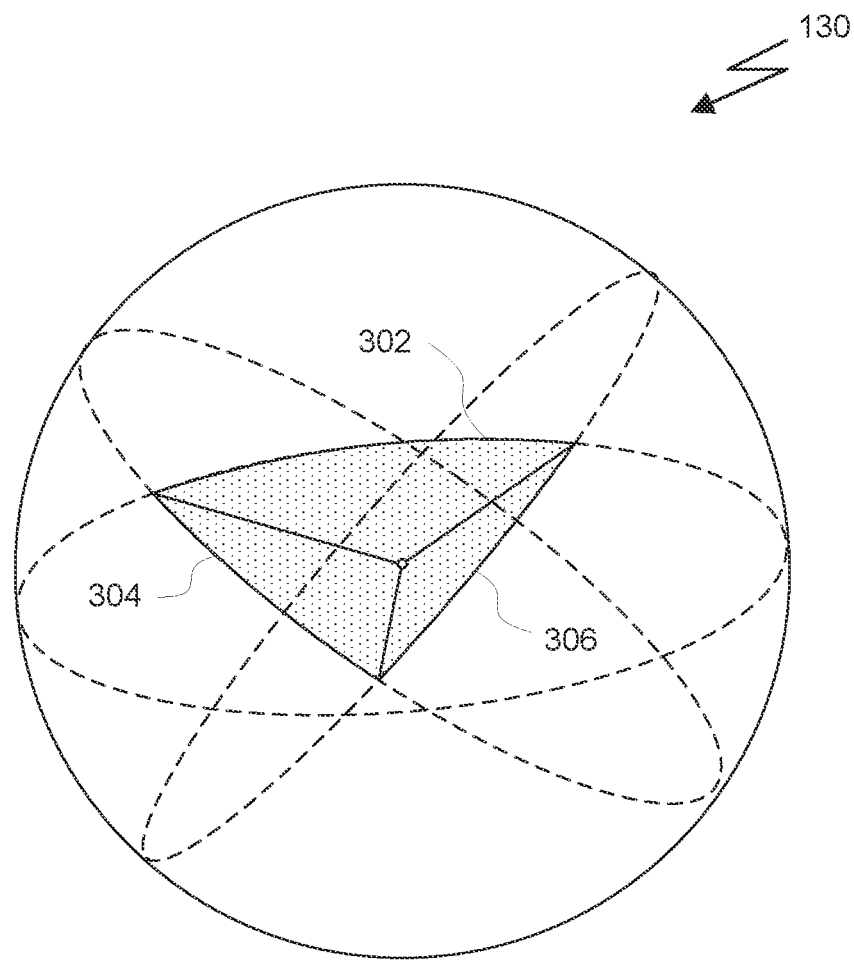
FIG. 3A illustrates a projected area on the unit circle including the origin of the unit circle, in accordance with some embodiments.

As illustrated in FIG. 3A, the origin of unit circle 112 is inside the projected area. Lower bound $R_0$ in this case is 0. The projected area is divided into three subareas, corresponding to three elliptic arcs 302, 304 and 306. Each subarea has a region bound by an elliptic arc. The density function for each subarea is:

$$f_{x,y} = \frac{1\{(x, y)^T \in \mathbb{A}\}}{\mathcal{A}} \tag{Eq. 17}$$

In polar coordinates, the density function may be rewritten as, $$f_{R,\phi} = f_{x,y} \left|\det\frac{\partial(x, y)}{\partial(R, \phi)}\right| = R \cdot 1\{R_0(\phi) < R < 1\} \cdot \frac{1\{\phi_0 < \phi < \phi_1\}}{\mathcal{A} \cdot \det L} \tag{Eq. 18}$$

Therefore, marginal density of $\phi$ is:

$$f_\phi = \frac{1 - R_0^2(\phi)}{2\mathcal{A} \cdot \det L} \cdot 1\{\phi_0 < \phi < \phi_1\} \tag{Eq. 19}$$

Furthermore, the conditional density of R is:

$$f_{R|\phi} = \frac{2R}{1 - R_0^2(\phi)} \cdot 1\{R_0(\phi) < R < 1\} \tag{Eq. 20}$$

When $R_0=0$, $\phi$ is a uniform random variable and R is a random variable with triangular distribution having a maximum probability corresponding with the origin of unit circle 112. It will be appreciated that cosine weighted sampling places more importance on samples close to the surface normal, which corresponds to samples close to the origin. Thus, the triangular distribution of the random variable R is equivalent to the cosine weighted distribution.

Figure 3B:
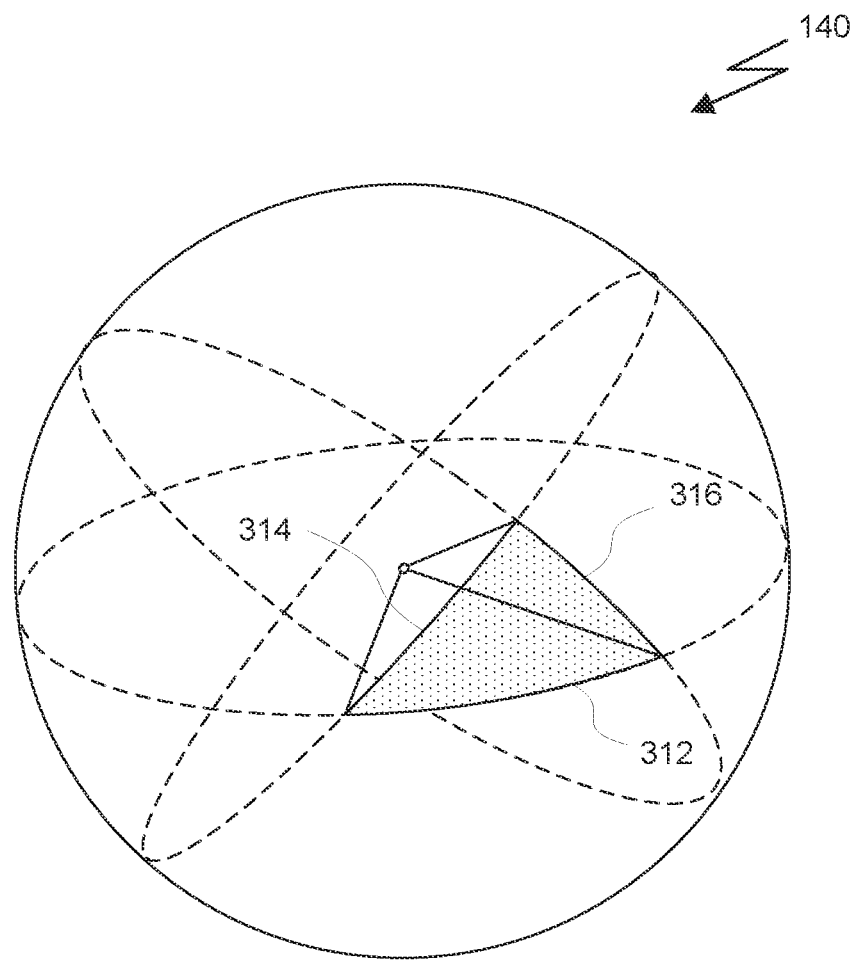
FIGS. 3B and 3C each illustrates a projected area on the unit circle not including the origin of the unit circle, in accordance with some embodiments.
Figure 3C:
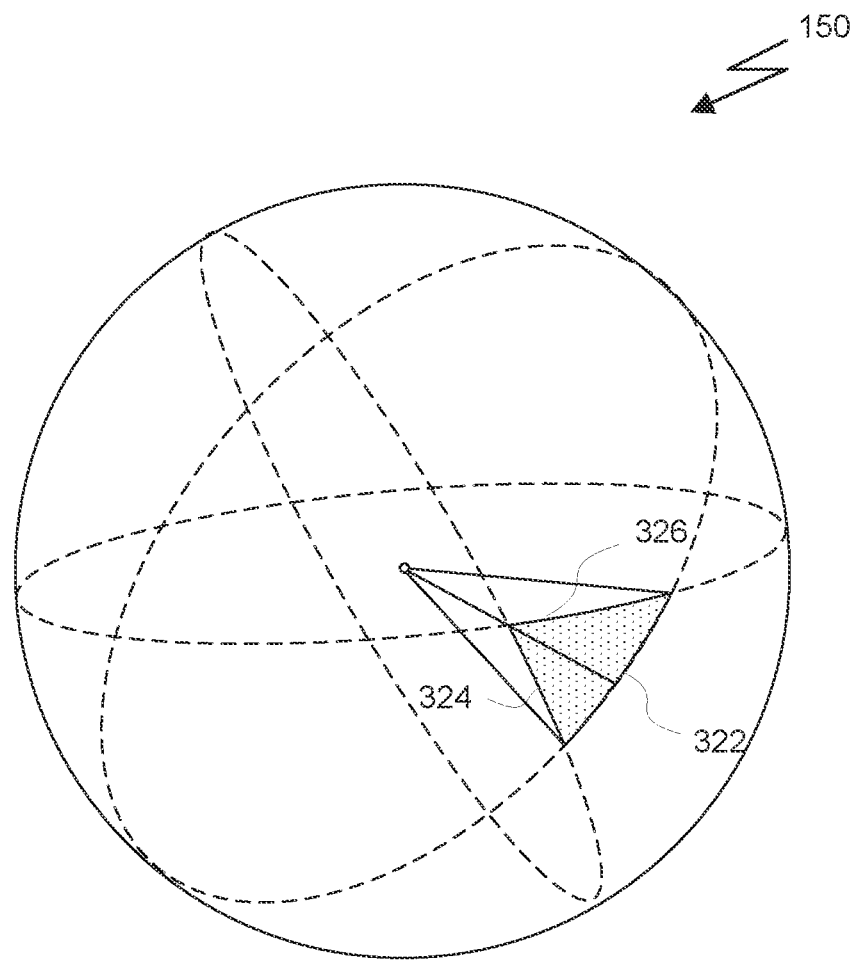

However, in some cases, the origin of the unit circle may not be inside the projected area 114 of the spherical triangle 108 on the unit circle 112, as illustrated in FIGS. 3B and 3C. Instead, $\phi$ is a random variable between two values $\phi_1$ and $\phi_2$ defined by the lines connecting the origin to the two outermost vertices. Again, the random variable R has a triangular distribution.

In FIG. 3B, the projected area is divided into two subareas. One subarea has a region bound by elliptic arc 316 and bordered by a first portion of elliptic arc 314. The other subarea has a region bound by elliptic arc 312 and bordered by a second portion of elliptic arc 314. $R_0$ is greater than 0 and is dependent on a solution for $R_0(\phi)$ corresponding to a set of elliptical parameters for elliptic arc 314.

In FIG. 3C, the projected area is enclosed by elliptic arc 322 and bordered by two elliptic arcs 324 and 326. $R_0$ is greater than 0 and is dependent on a solution for $R_0(\phi)$ corresponding to two different sets of elliptical parameters corresponding to elliptic arcs 324 and 326.

When the origin is not inside the projected area on the unit circle, $R_0$ has a more complex expression:

$$R_0(\phi) = \frac{\mu_1 \mu_3}{\xi_1^2 \mu_3^2 \cos^2\phi + 2\xi_1 \mu_3 (\xi_2 \mu_1 - \xi_1 \mu_2) \cos\phi \sin\phi + ((\xi_2 \mu_1 - \xi_1 \mu_2)^2 + (\xi_3 \mu_1)^2) \sin^2\phi}, \quad \text{(Eq. 21)}$$

where $$L = \begin{pmatrix} \mu_1 & \mu_2 \\ 0 & \mu_3 \end{pmatrix}, \text{ and } L_{in} = \begin{pmatrix} \xi_1 & \xi_2 \\ 0 & \xi_3 \end{pmatrix}.$$

As used in Equation 21, L is the matrix form of the outer ellipse that bounds the maximum value of R at a given angle $\phi$, and $L_{in}$ is the matrix form of the inner ellipse that bounds the minimum value of R at the angle $\phi$.

Furthermore, the cumulative distribution function (CDF) of $\phi$ is then written as:

$$F_\phi = \frac{1}{2\pi \det L} \left( \left( \phi - \tan^{-1} \frac{\left( \frac{l + 2k \cdot \tan\phi}{2 \det L \det L_{in}} \right)}{\det L_{in}} \right) - \left( \phi_0 - \tan^{-1} \frac{\left( \frac{l + 2k \cdot \tan\phi_0}{2 \det L \det L_{in}} \right)}{\det L_{in}} \right) \right), \quad \text{(Eq. 22)}$$

where $l = 2\xi_1 \mu_3 (\xi_2 \mu_1 - \xi_1 \mu_2)$, and $k = (\xi_2 \mu_1 - \xi_1 \mu_2)^2 + (\xi_3 \mu_1)^2$.

However, such CDF is not analytically invertible. Solutions to the problem can utilize techniques to solve the problem including using numerical inversion (which rapidly converges to the approximate solution given the monotonic nature of the PDF of Equation 19), an approximation of the CDF that is analytically invertible, as described in more detail in Peters et al., "Sampling Projected Spherical Caps in Real Time," Proceedings of the ACM on Computer Graphics and Interactive Techniques, vol. 2, No. 1, Art. 1, May 2019, which is hereby incorporated by reference in its entirety, or using a triangle cut technique as described in more detail in Heitz, "Can't Invert the CDF? The Triangle-Cut Parameterization of the Region Under the Curve," Eurographics Symposium on Rendering, vol. 39, No. 4, 2020, which is hereby incorporated by reference in its entirety.

Once the solution to the inverted CDF is found using one of the above techniques, then a uniform random variable can be applied to the inverted CDF to generate a random variable having the distribution approximating the CDF $F_\phi$, shown above. This new random variable with non-uniform distribution is used to populate the samples within the spherical polygon. For certain applications, including lighting calculations for ray-tracing algorithms, these samples result in images with less noise compared to prior art techniques.

Figure 2A:
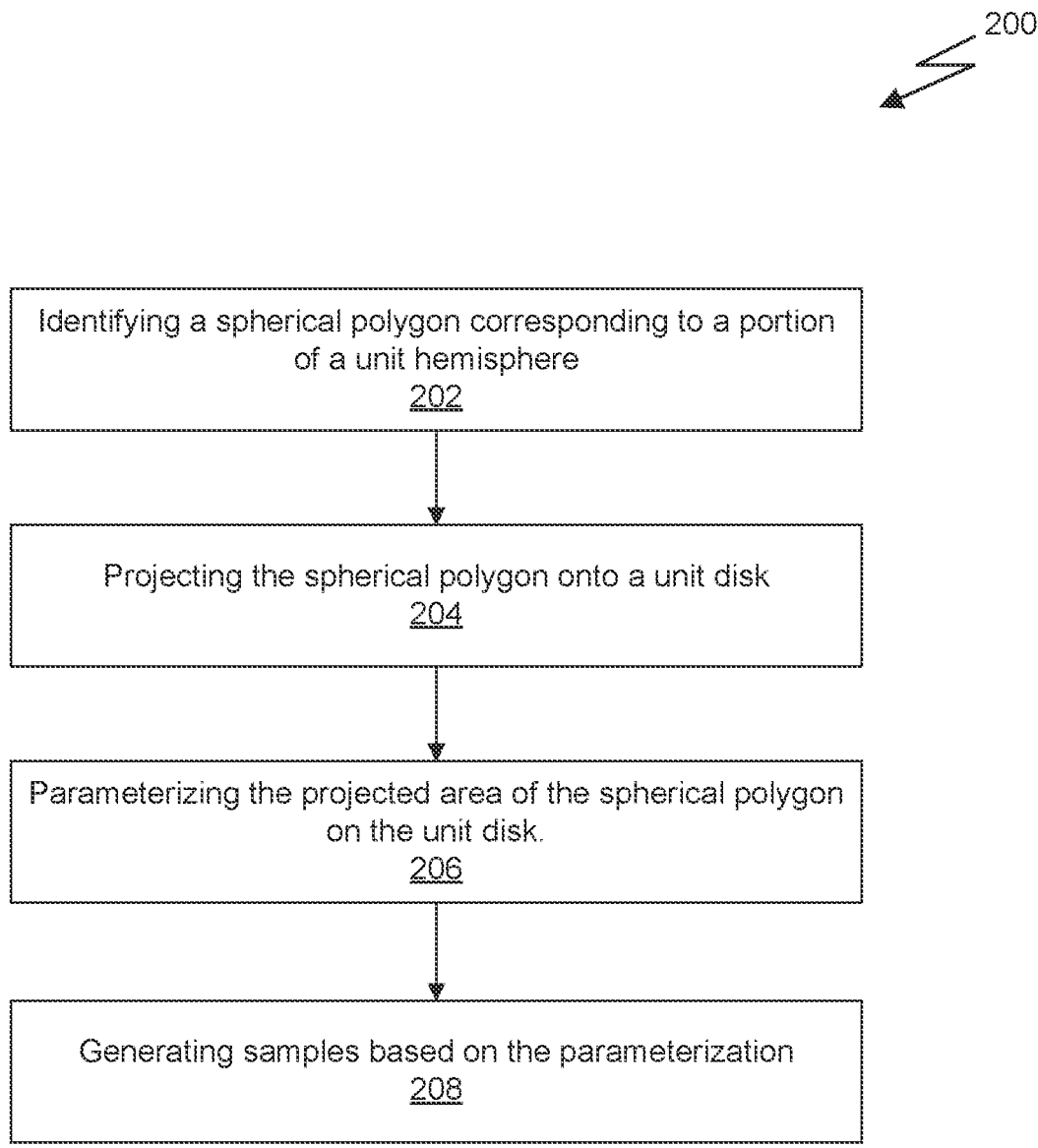
FIG. 2A illustrates a method of sampling a spherical polygon, in accordance with some embodiments.

FIG. 2A illustrates a method 200 of sampling a spherical polygon, according to the foregoing inversion-based sampling algorithm, in accordance with some embodiments.

At step 202, a spherical polygon is identified corresponding to a portion of a unit hemisphere. As illustrated in FIG. 1A, edge rays may be found by connecting edges of the polygonal area light to a point P on an object. The edges rays intersect with a unit hemisphere centered at point P on the object, as shown in FIG. 1B, such that the spherical polygon may be identified by the intersection of the edge rays with the unit hemisphere. Although the technique is applicable to sampling a spherical polygon in association with ray-tracing algorithms, it will be appreciated that the sampling technique may be applicable to cosine weighted sampling techniques outside the area of computer graphics and that any method for defining a spherical polygon on a unit hemisphere is within the scope of this disclosure.

In accordance with some embodiments, the spherical polygon on the hemisphere may be triangulated to produce a number of spherical triangles. Each spherical triangle may be bounded by a set of great circles on the hemisphere. According to some embodiments, the area light may not be fully above the horizon of the hemisphere. The part of area light below the horizon of the hemisphere may not directly contribute to rendering of point P. As such, the spherical polygon may be clipped at the horizon of the hemisphere prior to triangulating the spherical polygon.

At step 204, the spherical polygon is projected onto a unit circle. The projection is along a surface normal vector at point P, as illustrated in FIG. 1C. The projected area on the unit circle and the spherical polygon on the surface of the unit hemisphere are isometric, when the spherical polygon is embedded with cosine weighted distribution. Therefore, sampling the projected area on the unit circle is equivalent to sampling the spherical polygon on the unit hemisphere.

At step 206, the projected area of the spherical polygon on the unit circle is parameterized. The projected area of the spherical polygon may be enclosed by a set of ellipses that share an origin of the center of the unit circle. In some embodiments, the spherical polygon may be triangulated to produce a number of spherical triangles. Each spherical triangle may be projected to the unit circle. The projected area of the spherical triangle may be enclosed by a set of ellipses that share an origin of the center of the unit circle. The set of ellipses on the unit circle are projections of a set of great circles that enclose the spherical triangle on the unit hemisphere. Marginal density of $\phi$ may be derived as equation 19, and conditional density of R may be derived as equation 20. According to different cases in FIGS. 3A-3C, $R_0$ may have different expressions, which result in different expressions of the PDF and CDF for the projected area.

At step 208, samples are generated based on the parameterization. When the origin of the unit circle is inside the projected area as shown in FIG. 3A, $R_0=0$, $\phi$ is a uniform random variable, and R is a random variable with triangular distribution. The triangular distribution of the random variable R is equivalent to the cosine weighted distribution. When the origin of the unit circle is not inside the projected area as shown in FIGS. 3B and 3C, $R_0$ is expressed as equation 21. In an embodiment, a numerical approach may be applied to solve the PDF and CDF for generating the samples. An inverted CDF of $\phi$ may be found by the numerical approach. So that a uniform random variable can be applied to the inverted CDF to generate a random variable having the distribution approximating the CDF $F_\phi$, shown above in Equation 22.

Figure 2B:
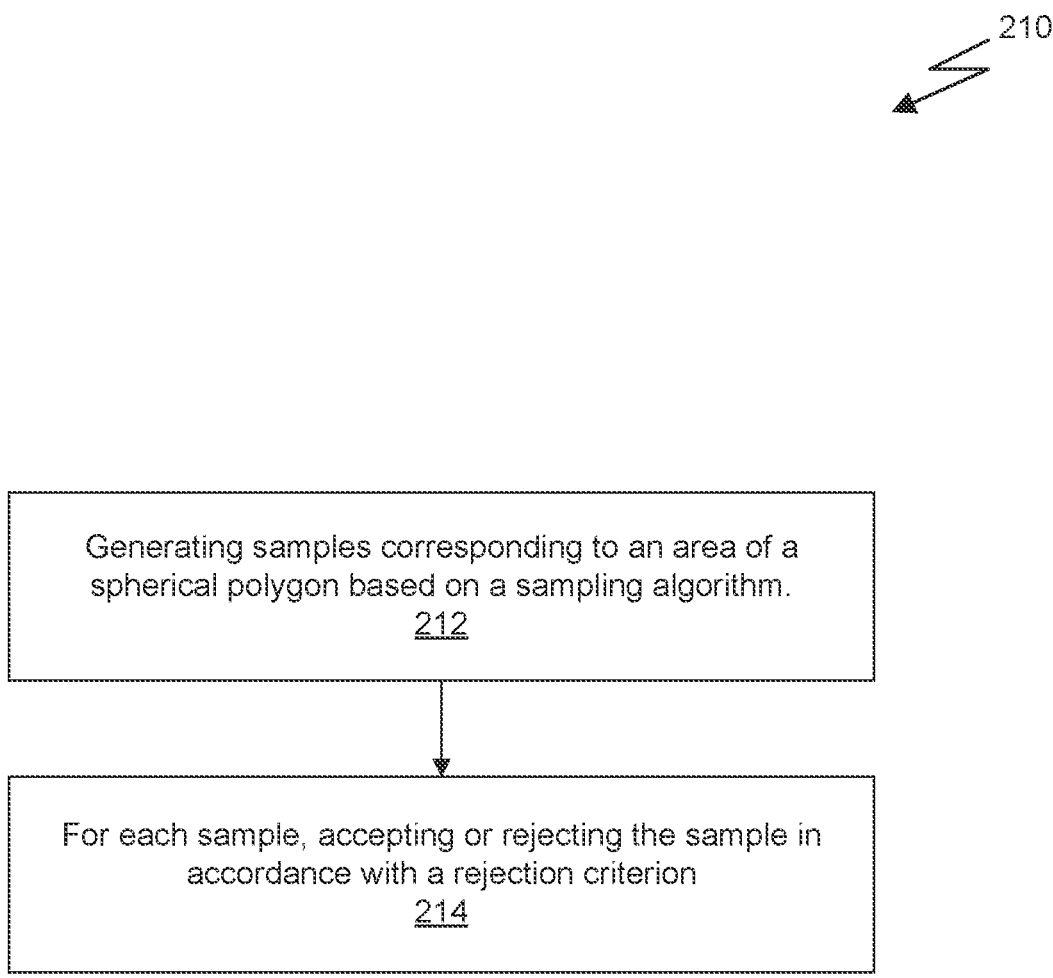
FIG. 2B illustrates a method of sampling based on a rejection criterion, in accordance with some embodiments.

According to an embodiment of the rejection-based method, acceptance criteria may be defined to accept or reject samples. As such, the resulting accepted samples within the spherical polygon may be distributed with cosine weight. FIG. 2B illustrates a method 210 of sampling based on a rejection criterion, in accordance with some embodiments.

At step 212, a plurality of samples corresponding to an area of a spherical polygon may be generated based on a sampling algorithm. Various sampling algorithms may be applied to generate the plurality of samples on the spherical polygon. For instance, samples may be randomly generated in accordance with a uniform distribution on the hemisphere.

In some embodiments, prior to generating the plurality of samples the spherical polygon may be clipped at the horizon of the unit hemisphere, when the spherical polygon is not fully above the horizon of the hemisphere. The clipped spherical polygon may be triangulated to produce a number of spherical triangles. Each spherical triangle may be selected with a discrete distribution proportional to its Lambert's integral over sum of Lambert's integrals of all spherical triangles. Samples are generated for each of the resulting spherical triangles, with all samples located above the horizon.

At step 214, for each sample, a rejection criterion may be applied to accept or reject the sample. The acceptance criterion may be defined as comparing a random or pseudo random value with a parameter. In one embodiment, the parameter may be defined as an acceptance probability $$\frac{z}{z_m},$$

that is a ratio of the z value of the sample to a maximum z value within the spherical polygon.

In some embodiments, one sample is generated at a time and then accepted or rejected based on a rejection criterion. Subsequently, a next sample is generated and then accepted or rejected based on the rejection criterion. By repeatedly performing the steps of generating a sample and accepting or rejecting the sample based on the rejection criterion, a plurality of samples that meet the rejection criterion may be generated.

In some cases, where clipping is not performed prior to applying the rejection criterion, any sample located below the horizon can be rejected automatically (i.e., acceptance probability is 0%).

The first step to determine the acceptance probability $$\frac{z}{z_m}$$

is to determine the maximum z value of the spherical polygon. When the pole of the hemisphere is included in the spherical polygon, $z_m=1$. When the pole of the hemisphere is not included in the spherical polygon, $z_m$ may be determined by first searching the maximum z on the edges of the spherical polygon. The spherical polygon is bounded by a set of great circles on the hemisphere. As such, the edges of the spherical polygon may be parameterized by the set of great circles. Hence, $z_m$ may be determined by solving the maximization problem with Lagrange coefficients:

$$z+\lambda_1(x^2+y^2+z^2-1)+\lambda_2(Ax+By+Cz) \quad \text{(Eq. 23)}$$

The solution is:

$$\frac{(-A \cdot C, -B \cdot C, A^2 + B^2)^T}{\sqrt{A^2 + B^2}} \quad \text{(Eq. 24)}$$

The maximum z of the edges may be determined based on the solution to Equation 24 and by checking if the point is inside the spherical polygon. After determining the maximum z of the edges, $z_m$ is determined by determining the maximum z among the vertices and the edges. It will be appreciated that Equation 24 is the maximum z of the great circle corresponding to an edge, and that point on the great circle may or may not be included in the edge of the corresponding spherical polygon. Consequently, if the maximum z calculated from Equation 24 is not including in the spherical polygon, that value can be discarded and the maximum z for that edge will fall at one of the vertices of the spherical polygon.

When the acceptance probability is high enough, the rejection sampling is efficient and most of stratification sampling is maintained. For example, a spherical triangle is sampled based on the rejection sampling. The worst-case acceptance rate is approximately 0.33, which occurs when two vertices are nearby on the horizon, and the third vertex with a relatively small height is in the middle between the two vertices. When three vertices are on the horizon, the acceptance probability is typically above 0.5. When no more than one vertex is on the horizon, the acceptance probability is typically higher than 0.7. When no vertices are on the horizon, the acceptance probability is typically above 0.85. It will be appreciated that the example acceptance probabilities are applied to spherical triangles and that, while the behavior is similar for spherical quads, the manner of counting vertices relative to the horizon is different and will result in different acceptance probabilities.

In an embodiment, a quality of the rejection sampling method is typically sufficient with up to three tries. However, if all three tries fail, a point with the highest acceptance ratio may be selected.

Figure 2C:
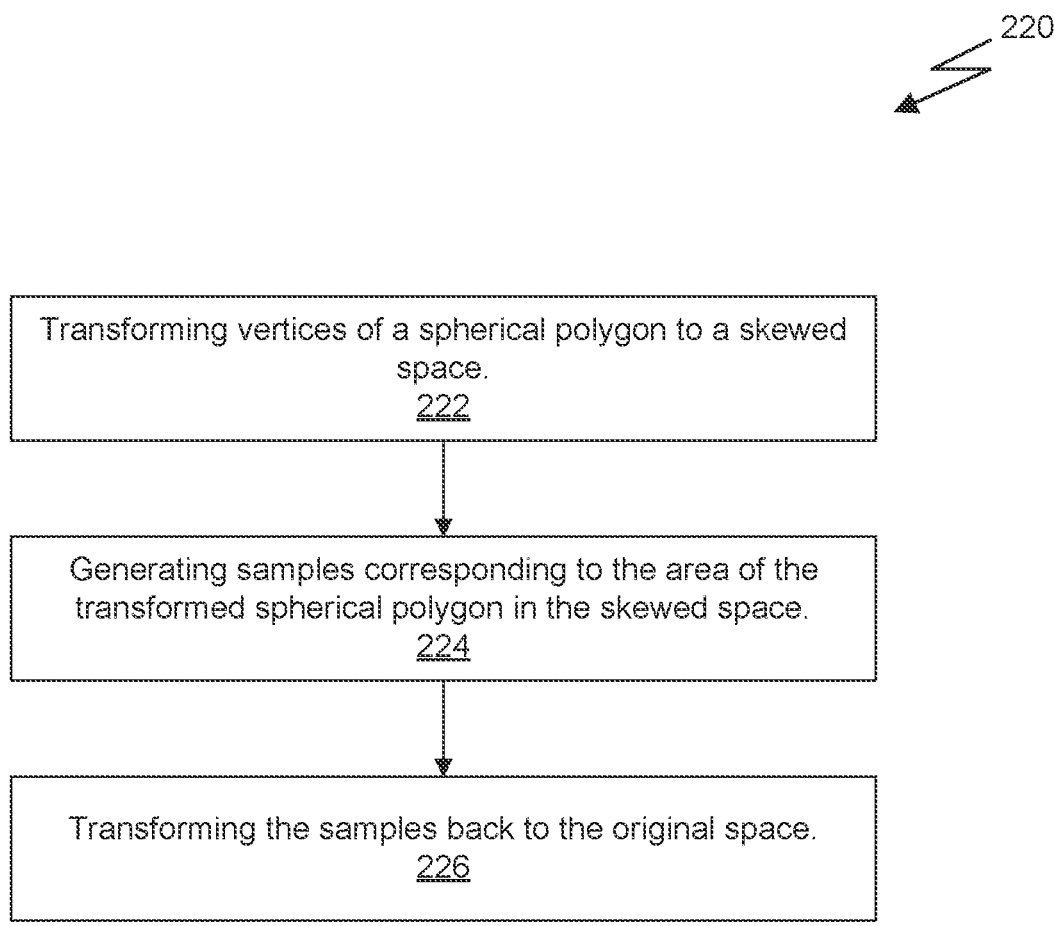
FIG. 2C illustrates a method of applying sampling methods to the GGX bidirectional reflectance density function (BRDF), in accordance with some embodiments.

As described herein, the foregoing sampling methods may be applied to evaluate rendering equation with Lambertian materials that are ideal diffusers. Additionally, the sampling methods described herein may be applied to evaluate a rendering equation considering specular effects. In one embodiment, the specular effects are incorporated by expressing $f_{BSDF}$ in Equation 1 with a GGX BRDF. With non-textured area light, ideally the product of the GGX term times the cosine term in the rendering equation needs to be sampled. Alternatively, the GGX term in the rendering equation may be approximately cancelled out by applying a Linearly transformed cosines (LTC) technique as described in more detail in Heitz, "Real-time polygonal-light shading with linearly transformed cosines", ACM Transactions on Graphics, Article No. 41, July 2016, which is hereby incorporated by reference in its entirety. As such, only the cosine term of the rendering equation needs to be sampled, which may be solved by applying the foregoing sampling methods. FIG. 2C illustrates an embodiment 220 of applying the foregoing methods to the GGX BRDF, in accordance with some embodiments.

At step 222, vertices of a spherical polygon may be transformed to a skewed space. An LTC transformation described in Heitz may be applied. The LTC transformation is a linear transformation, that is represented by a 3×3 matrix. The LTC transformation is applied to the direction vectors of a spherical distribution, which yields another spherical distribution with a solvable closed-form expression (e.g., via the methods 200 or 210). The transformation from LTC uses least squares minimization to determine a skewed space, in which a cosine distribution approximates the corresponding GGX distribution.

At step 224, a plurality of samples corresponding to the area of the transformed spherical polygon in the skewed space may be generated. Each of methods 200 and 210, or combined methods, may be applied in this step to generate the plurality of samples in the skewed space.

At step 226, the generated samples in the skewed space may be transformed back to the original space based on the LTC matrix. The LTC transformation described in Heitz may be applied.

The samples when applying to lighting calculations for ray-tracing algorithms result in images with less noise compared to prior art techniques.

Parallel Processing Architecture

Figure 4:
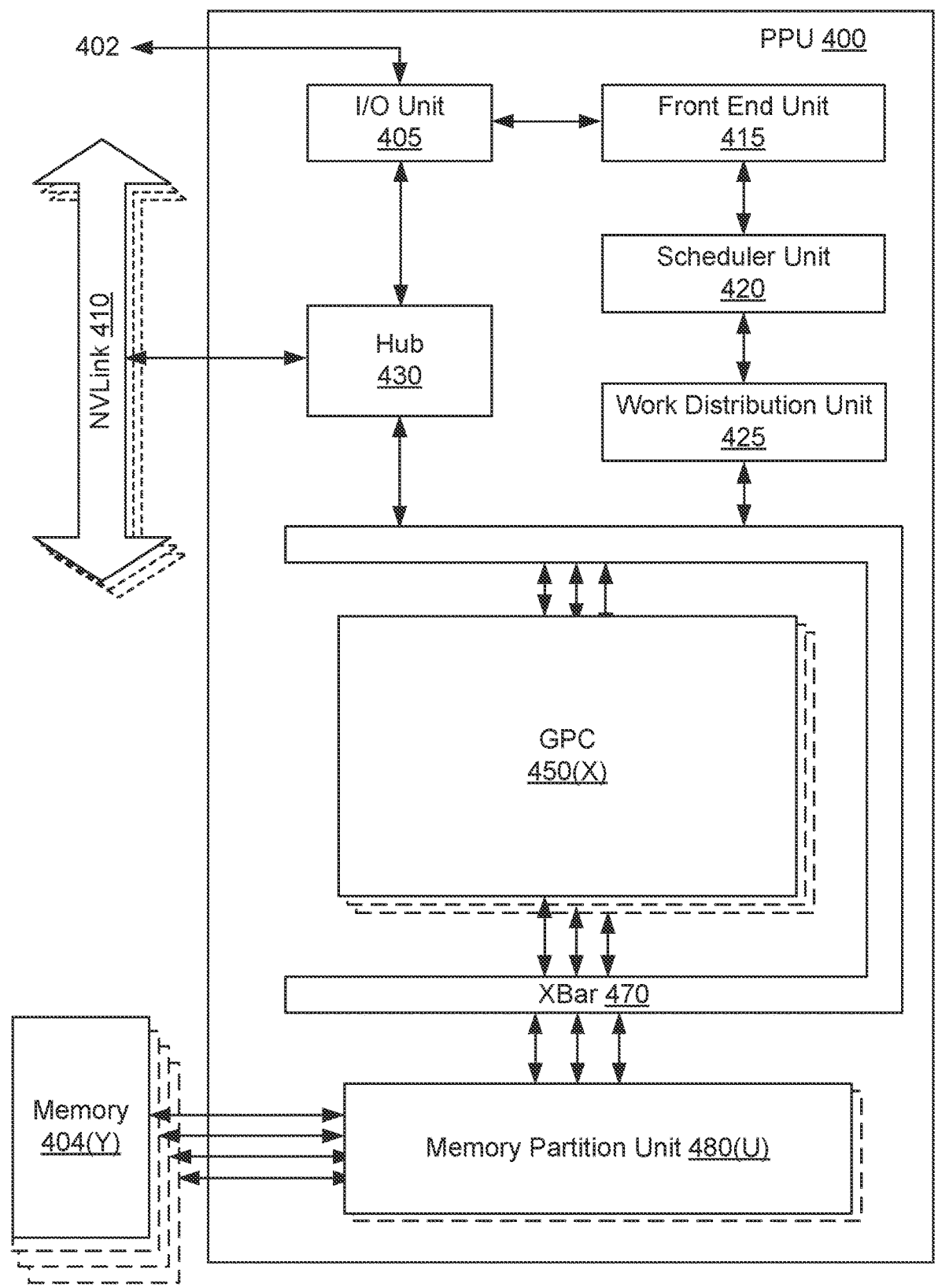
FIG. 4 illustrates an example parallel processing unit suitable for use in implementing some embodiments of the present disclosure.

FIG. 4 illustrates a parallel processing unit (PPU) 400, in accordance with an embodiment. The PPU 400 may be used to implement any portion of the methods 200, 210, or 220 set forth above. For example, the PPU 400 may be utilized by a ray-tracing algorithm to generate images for display. The ray-tracing algorithm may generate samples for calculating lighting values of a ray, where the samples are generated using one of the techniques set forth above.

In an embodiment, the PPU 400 is a multi-threaded processor that is implemented on one or more integrated circuit devices. The PPU 400 is a latency hiding architecture designed to process many threads in parallel. A thread (e.g., a thread of execution) is an instantiation of a set of instructions configured to be executed by the PPU 400. In an embodiment, the PPU 400 is a graphics processing unit (GPU) configured to implement a graphics rendering pipeline for processing three-dimensional (3D) graphics data in order to generate two-dimensional (2D) image data for display on a display device. In other embodiments, the PPU 400 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 400 may be configured to accelerate thousands of High Performance Computing (HPC), data center, cloud computing, and machine learning applications. The PPU 400 may be configured to accelerate numerous deep learning systems and applications for autonomous vehicles, simulation, computational graphics such as ray or path tracing, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 4, the PPU 400 includes an Input/Output (I/O) unit 405, a front end unit 415, a scheduler unit 420, a work distribution unit 425, a hub 430, a crossbar (Xbar) 470, one or more general processing clusters (GPCs) 450, and one or more memory partition units 480. The PPU 400 may be connected to a host processor or other PPUs 400 via one or more high-speed NVLink 410 interconnect. The PPU 400 may be connected to a host processor or other peripheral devices via an interconnect 402. The PPU 400 may also be connected to a local memory 404 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 410 interconnect enables systems to scale and include one or more PPUs 400 combined with one or more CPUs, supports cache coherence between the PPUs 400 and CPUs, and CPU mastering. Data and/or commands may be transmitted by the NVLink 410 through the hub 430 to/from other units of the PPU 400 such as one or more copy engines, a video encoder, a video decoder, a power management unit, etc. (not explicitly shown). The NVLink 410 is described in more detail in conjunction with FIG. 5B.

The I/O unit 405 is configured to transmit and receive communications (e.g., commands, data, etc.) from a host processor (not shown) over the interconnect 402. The I/O unit 405 may communicate with the host processor directly via the interconnect 402 or through one or more intermediate devices such as a memory bridge. In an embodiment, the I/O unit 405 may communicate with one or more other processors, such as one or more the PPUs 400 via the interconnect 402. In an embodiment, the I/O unit 405 implements a Peripheral Component Interconnect Express (PCIe) interface for communications over a PCIe bus and the interconnect 402 is a PCIe bus. In alternative embodiments, the I/O unit 405 may implement other types of well-known interfaces for communicating with external devices.

The I/O unit 405 decodes packets received via the interconnect 402. In an embodiment, the packets represent commands configured to cause the PPU 400 to perform various operations. The I/O unit 405 transmits the decoded commands to various other units of the PPU 400 as the commands may specify. For example, some commands may be transmitted to the front end unit 415. Other commands may be transmitted to the hub 430 or other units of the PPU 400 such as one or more copy engines, a video encoder, a video decoder, a power management unit, etc. (not explicitly shown). In other words, the I/O unit 405 is configured to route communications between and among the various logical units of the PPU 400.

In an embodiment, a program executed by the host processor encodes a command stream in a buffer that provides workloads to the PPU 400 for processing. A workload may comprise several instructions and data to be processed by those instructions. The buffer is a region in a memory that is accessible (e.g., read/write) by both the host processor and the PPU 400. For example, the I/O unit 405 may be configured to access the buffer in a system memory connected to the interconnect 402 via memory requests transmitted over the interconnect 402. In an embodiment, the host processor writes the command stream to the buffer and then transmits a pointer to the start of the command stream to the PPU 400. The front end unit 415 receives pointers to one or more command streams. The front end unit 415 manages the one or more streams, reading commands from the streams and forwarding commands to the various units of the PPU 400.

The front end unit 415 is coupled to a scheduler unit 420 that configures the various GPCs 450 to process tasks defined by the one or more streams. The scheduler unit 420 is configured to track state information related to the various tasks managed by the scheduler unit 420. The state may indicate which GPC 450 a task is assigned to, whether the task is active or inactive, a priority level associated with the task, and so forth. The scheduler unit 420 manages the execution of a plurality of tasks on the one or more GPCs 450.

The scheduler unit 420 is coupled to a work distribution unit 425 that is configured to dispatch tasks for execution on the GPCs 450. The work distribution unit 425 may track a number of scheduled tasks received from the scheduler unit 420. In an embodiment, the work distribution unit 425 manages a pending task pool and an active task pool for each of the GPCs 450. As a GPC 450 finishes the execution of a task, that task is evicted from the active task pool for the GPC 450 and one of the other tasks from the pending task pool is selected and scheduled for execution on the GPC 450. If an active task has been idle on the GPC 450, such as while waiting for a data dependency to be resolved, then the active task may be evicted from the GPC 450 and returned to the pending task pool while another task in the pending task pool is selected and scheduled for execution on the GPC 450.

In an embodiment, a host processor executes a driver kernel that implements an application programming interface (API) that enables one or more applications executing on the host processor to schedule operations for execution on the PPU 400. In an embodiment, multiple compute applications are simultaneously executed by the PPU 400 and the PPU 400 provides isolation, quality of service (QoS), and independent address spaces for the multiple compute applications. An application may generate instructions (e.g., API calls) that cause the driver kernel to generate one or more tasks for execution by the PPU 400. The driver kernel outputs tasks to one or more streams being processed by the PPU 400. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. The tasks may be allocated to one or more processing units within a GPC 450 and instructions are scheduled for execution by at least one warp.

The work distribution unit 425 communicates with the one or more GPCs 450 via XBar 470. The XBar 470 is an interconnect network that couples many of the units of the PPU 400 to other units of the PPU 400. For example, the XBar 470 may be configured to couple the work distribution unit 425 to a particular GPC 450. Although not shown explicitly, one or more other units of the PPU 400 may also be connected to the XBar 470 via the hub 430.

The tasks are managed by the scheduler unit 420 and dispatched to a GPC 450 by the work distribution unit 425. The GPC 450 is configured to process the task and generate results. The results may be consumed by other tasks within the GPC 450, routed to a different GPC 450 via the XBar 470, or stored in the memory 404. The results can be written to the memory 404 via the memory partition units 480, which implement a memory interface for reading and writing data to/from the memory 404. The results can be transmitted to another PPU 400 or CPU via the NVLink 410. In an embodiment, the PPU 400 includes a number U of memory partition units 480 that is equal to the number of separate and distinct memory devices of the memory 404 coupled to the PPU 400. Each GPC 450 may include a memory management unit to provide translation of virtual addresses into physical addresses, memory protection, and arbitration of memory requests. In an embodiment, the memory management unit provides one or more translation lookaside buffers (TLBs) for performing translation of virtual addresses into physical addresses in the memory 404.

In an embodiment, the memory partition unit 480 includes a Raster Operations (ROP) unit, a level two (L2) cache, and a memory interface that is coupled to the memory 404. The memory interface may implement 32, 64, 128, 1024-bit data buses, or the like, for high-speed data transfer. The PPU 400 may be connected to up to Y memory devices, such as high bandwidth memory stacks or graphics double-data-rate, version 5, synchronous dynamic random access memory, or other types of persistent storage. In an embodiment, the memory interface implements an HBM2 memory interface and Y equals half U. In an embodiment, the HBM2 memory stacks are located on the same physical package as the PPU 400, providing substantial power and area savings compared with conventional GDDR5 SDRAM systems. In an embodiment, each HBM2 stack includes four memory dies and Y equals 4, with each HBM2 stack including two 128-bit channels per die for a total of 8 channels and a data bus width of 1024 bits.

In an embodiment, the memory 404 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 400 process very large datasets and/or run applications for extended periods.

In an embodiment, the PPU 400 implements a multi-level memory hierarchy. In an embodiment, the memory partition unit 480 supports a unified memory to provide a single unified virtual address space for CPU and PPU 400 memory, enabling data sharing between virtual memory systems. In an embodiment the frequency of accesses by a PPU 400 to memory located on other processors is traced to ensure that memory pages are moved to the physical memory of the PPU 400 that is accessing the pages more frequently. In an embodiment, the NVLink 410 supports address translation services allowing the PPU 400 to directly access a CPU's page tables and providing full access to CPU memory by the PPU 400.

In an embodiment, copy engines transfer data between multiple PPUs 400 or between PPUs 400 and CPUs. The copy engines can generate page faults for addresses that are not mapped into the page tables. The memory partition unit 480 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 404 or other system memory may be fetched by the memory partition unit 480 and stored in the L2 cache 460, which is located on-chip and is shared between the various GPCs 450. As shown, each memory partition unit 480 includes a portion of the L2 cache associated with a corresponding memory 404. Lower level caches may then be implemented in various units within the GPCs 450. For example, each of the processing units within a GPC 450 may implement a level one (L1) cache. The L1 cache is private memory that is dedicated to a particular processing unit. The L2 cache 460 is coupled to the memory interface 470 and the XBar 470 and data from the L2 cache may be fetched and stored in each of the L1 caches for processing.

In an embodiment, the processing units within each GPC 450 implement a SIMD (Single-Instruction, Multiple-Data) architecture where each thread in a group of threads (e.g., a warp) is configured to process a different set of data based on the same set of instructions. All threads in the group of threads execute the same instructions. In another embodiment, the processing unit implements a SIMT (Single- Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

Each processing unit includes a large number (e.g., 128, etc.) of distinct processing cores (e.g., functional units) that may be fully-pipelined, single-precision, double-precision, and/or mixed precision and include a floating point arithmetic logic unit and an integer arithmetic logic unit. In an embodiment, the floating point arithmetic logic units implement the IEEE 754-2008 standard for floating point arithmetic. In an embodiment, the cores include 64 single-precision (32-bit) floating point cores, 64 integer cores, 32 double-precision (64-bit) floating point cores, and 8 tensor cores.

Tensor cores configured to perform matrix operations. In particular, the tensor cores are configured to perform deep learning matrix arithmetic, such as GEMM (matrix-matrix multiplication) for convolution operations during neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B may be integer, fixed-point, or floating point matrices, while the accumulation matrices C and D may be integer, fixed-point, or floating point matrices of equal or higher bitwidths. In an embodiment, tensor cores operate on one, four, or eight bit integer input data with 32-bit integer accumulation. The 8-bit integer matrix multiply requires 1024 operations and results in a full precision product that is then accumulated using 32-bit integer addition with the other intermediate products for a 8×8×16 matrix multiply. In an embodiment, tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each processing unit may also comprise M special function units (SFUs) that perform special functions (e.g., attribute evaluation, reciprocal square root, and the like). In an embodiment, the SFUs may include a tree traversal unit configured to traverse a hierarchical tree data structure. In an embodiment, the SFUs may include texture unit configured to perform texture map filtering operations. In an embodiment, the texture units are configured to load texture maps (e.g., a 2D array of texels) from the memory 404 and sample the texture maps to produce sampled texture values for use in shader programs executed by the processing unit. In an embodiment, the texture maps are stored in shared memory that may comprise or include an L1 cache. The texture units implement texture operations such as filtering operations using mip-maps (e.g., texture maps of varying levels of detail). In an embodiment, each processing unit includes two texture units.

Each processing unit also comprises N load store units (LSUs) that implement load and store operations between the shared memory and the register file. Each processing unit includes an interconnect network that connects each of the cores to the register file and the LSU to the register file, shared memory. In an embodiment, the interconnect network is a crossbar that can be configured to connect any of the cores to any of the registers in the register file and connect the LSUs to the register file and memory locations in shared memory.

The shared memory is an array of on-chip memory that allows for data storage and communication between the processing units and between threads within a processing unit. In an embodiment, the shared memory comprises 128 KB of storage capacity and is in the path from each of the processing units to the memory partition unit 480. The shared memory can be used to cache reads and writes. One or more of the shared memory, L1 cache, L2 cache, and memory 404 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory enables the shared memory to function as a high-throughput conduit for streaming data while simultaneously providing high-bandwidth and low-latency access to frequently reused data.

When configured for general purpose parallel computation, a simpler configuration can be used compared with graphics processing. Specifically, fixed function graphics processing units, are bypassed, creating a much simpler programming model. In the general purpose parallel computation configuration, the work distribution unit 425 assigns and distributes blocks of threads directly to the processing units within the GPCs 450. Threads execute the same program, using a unique thread ID in the calculation to ensure each thread generates unique results, using the processing unit(s) to execute the program and perform calculations, shared memory to communicate between threads, and the LSU to read and write global memory through the shared memory and the memory partition unit 480. When configured for general purpose parallel computation, the processing units can also write commands that the scheduler unit 420 can use to launch new work on the processing units.

The PPUs 400 may each include, and/or be configured to perform functions of, one or more processing cores and/or components thereof, such as Tensor Cores (TCs), Tensor Processing Units (TPUs), Pixel Visual Cores (PVCs), Ray Tracing (RT) Cores, Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The PPU 400 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 400 is embodied on a single semiconductor substrate. In another embodiment, the PPU 400 is included in a system-on-a-chip (SoC) along with one or more other devices such as additional PPUs 400, the memory 404, a reduced instruction set computer (RISC) CPU, a memory management unit (MMU), a digital-to-analog converter (DAC), and the like.

In an embodiment, the PPU 400 may be included on a graphics card that includes one or more memory devices. The graphics card may be configured to interface with a PCIe slot on a motherboard of a desktop computer. In yet another embodiment, the PPU 400 may be an integrated graphics processing unit (iGPU) or parallel processor included in the chipset of the motherboard. In yet another embodiment, the PPU 400 may be realized in reconfigurable hardware. In yet another embodiment, parts of the PPU 400 may be realized in reconfigurable hardware.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5A:
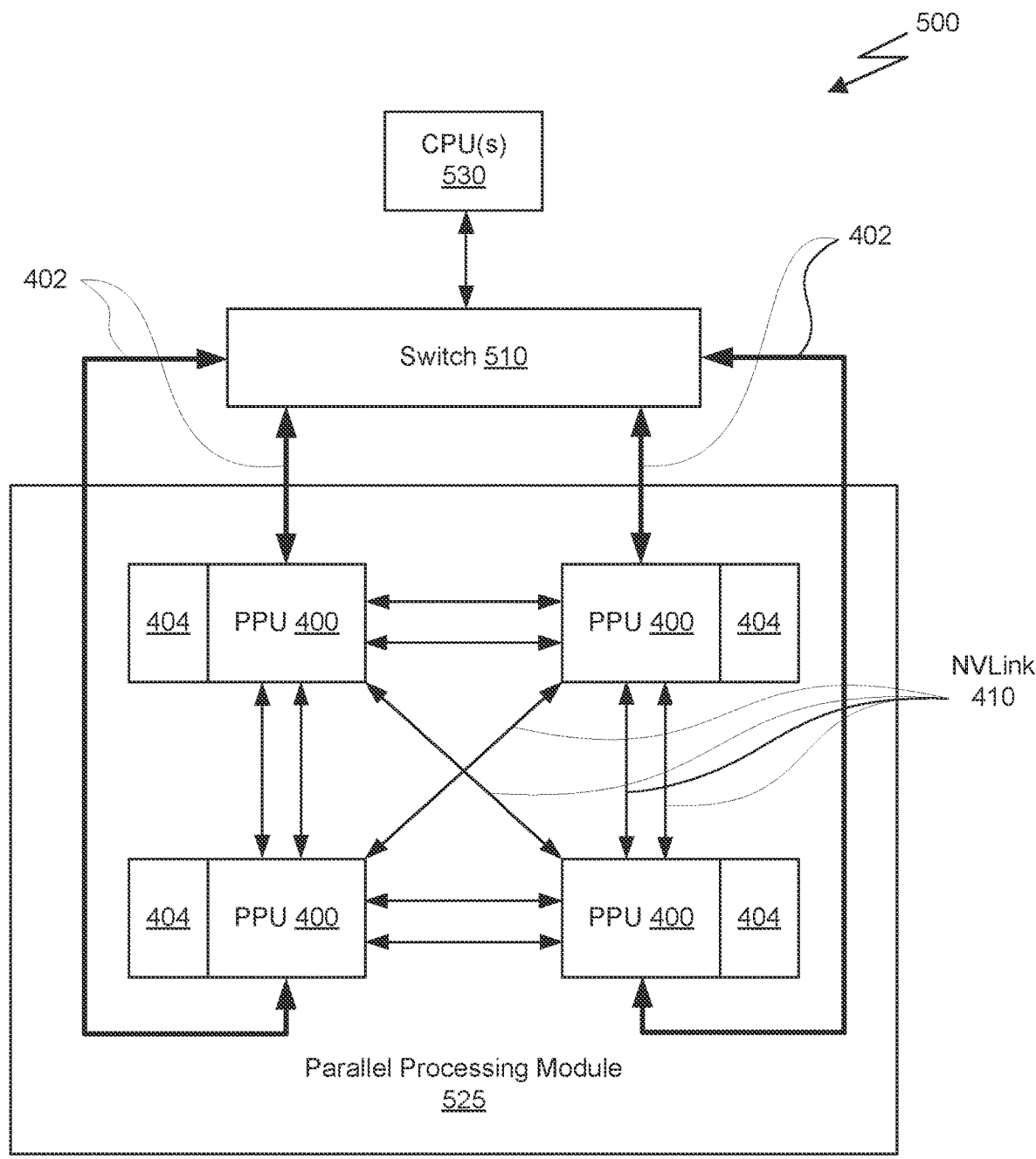
FIG. 5A is a conceptual diagram of a processing system implemented using the PPU of FIG. 4, suitable for use in implementing some embodiments of the present disclosure.

FIG. 5A is a conceptual diagram of a processing system 500 implemented using the PPU 400 of FIG. 4, in accordance with an embodiment. The exemplary system 565 may be configured to implement the method(s) shown in FIGS. 2A-2C. The processing system 500 includes a CPU 530, switch 510, and multiple PPUs 400, and respective memories 404.

Figure 5B:
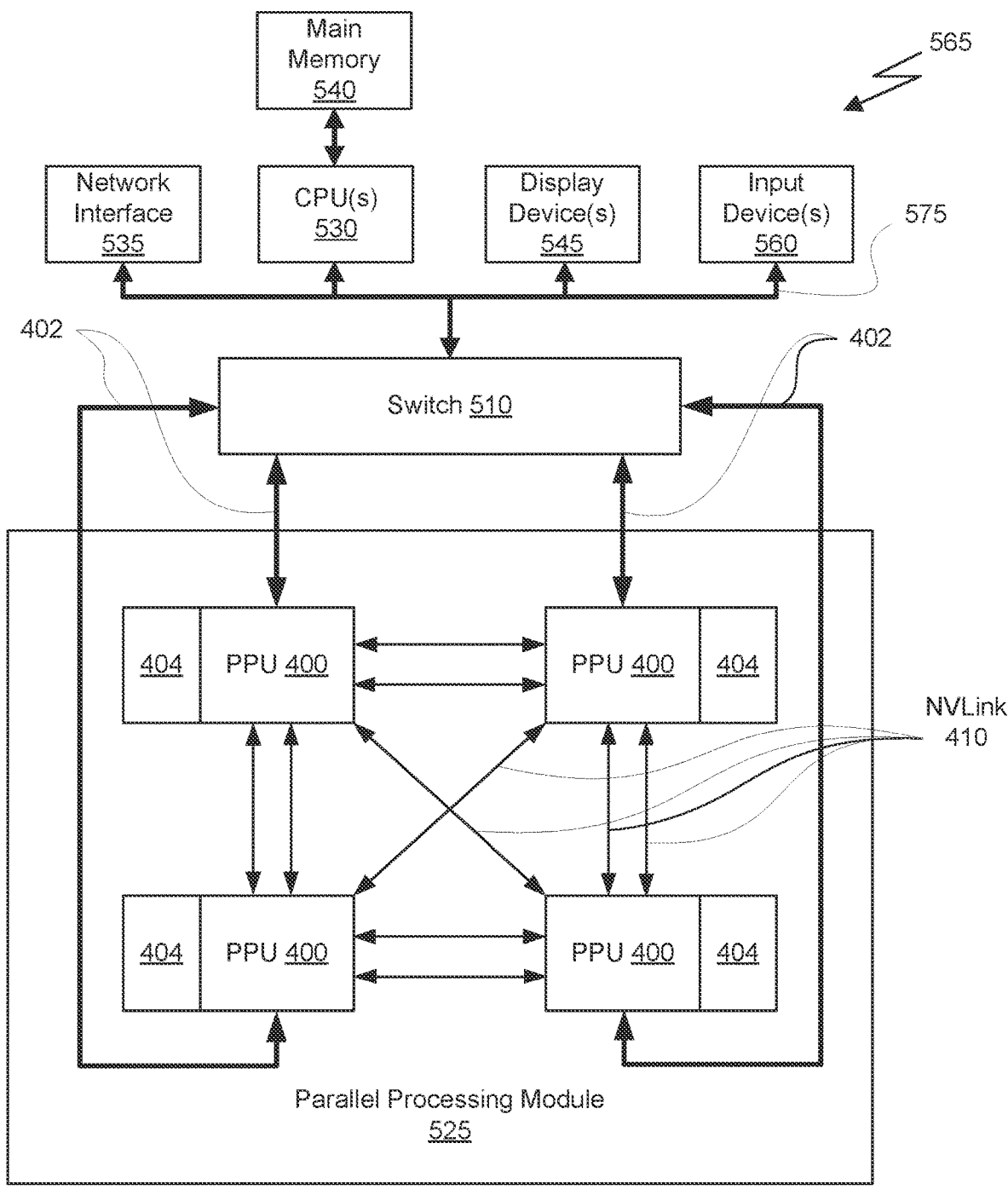
FIG. 5B illustrates an exemplary system in which the various architecture and/or functionality of the various previous embodiments may be implemented.

The NVLink 410 provides high-speed communication links between each of the PPUs 400. Although a particular number of NVLink 410 and interconnect 402 connections are illustrated in FIG. 5B, the number of connections to each PPU 400 and the CPU 530 may vary. The switch 510 interfaces between the interconnect 402 and the CPU 530. The PPUs 400, memories 404, and NVLinks 410 may be situated on a single semiconductor platform to form a parallel processing module 525. In an embodiment, the switch 510 supports two or more protocols to interface between various different connections and/or links.

In another embodiment (not shown), the NVLink 410 provides one or more high-speed communication links between each of the PPUs 400 and the CPU 530 and the switch 510 interfaces between the interconnect 402 and each of the PPUs 400. The PPUs 400, memories 404, and interconnect 402 may be situated on a single semiconductor platform to form a parallel processing module 525. In yet another embodiment (not shown), the interconnect 402 provides one or more communication links between each of the PPUs 400 and the CPU 530 and the switch 510 interfaces between each of the PPUs 400 using the NVLink 410 to provide one or more high-speed communication links between the PPUs 400. In another embodiment (not shown), the NVLink 410 provides one or more high-speed communication links between the PPUs 400 and the CPU 530 through the switch 510. In yet another embodiment (not shown), the interconnect 402 provides one or more communication links between each of the PPUs 400 directly. One or more of the NVLink 410 high-speed communication links may be implemented as a physical NVLink interconnect or either an on-chip or on-die interconnect using the same protocol as the NVLink 410.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 400 and/or memories 404 may be packaged devices. In an embodiment, the CPU 530, switch 510, and the parallel processing module 525 are situated on a single semiconductor platform.

In an embodiment, the signaling rate of each NVLink 410 is 20 to 25 Gigabits/second and each PPU 400 includes six NVLink 410 interfaces (as shown in FIG. 5A, five NVLink 410 interfaces are included for each PPU 400). Each NVLink 410 provides a data transfer rate of 25 Gigabytes/second in each direction, with six links providing 400 Gigabytes/second. The NVLinks 410 can be used exclusively for PPU-to-PPU communication as shown in FIG. 5A, or some combination of PPU-to-PPU and PPU-to-CPU, when the CPU 530 also includes one or more NVLink 410 interfaces.

In an embodiment, the NVLink 410 allows direct load/store/atomic access from the CPU 530 to each PPU's 400 memory 404. In an embodiment, the NVLink 410 supports coherency operations, allowing data read from the memories 404 to be stored in the cache hierarchy of the CPU 530, reducing cache access latency for the CPU 530. In an embodiment, the NVLink 410 includes support for Address Translation Services (ATS), allowing the PPU 400 to directly access page tables within the CPU 530. One or more of the NVLinks 410 may also be configured to operate in a low-power mode.

FIG. 5B illustrates an exemplary system 565 in which the various architecture and/or functionality of the various previous embodiments may be implemented. The exemplary system 565 may be configured to implement the method(s) shown in FIGS. 2A-2C.

As shown, a system 565 is provided including at least one central processing unit 530 that is connected to a communication bus 575. The communication bus 575 may directly or indirectly couple one or more of the following devices: main memory 540, network interface 535, CPU(s) 530, display device(s) 545, input device(s) 560, switch 510, and parallel processing system 525. The communication bus 575 may be implemented using any suitable protocol and may represent one or more links or busses, such as an address bus, a data bus, a control bus, or a combination thereof. The communication bus 575 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, HyperTransport, and/or another type of bus or link. In some embodiments, there are direct connections between components. As an example, the CPU(s) 530 may be directly connected to the main memory 540. Further, the CPU(s) 530 may be directly connected to the parallel processing system 525. Where there is direct, or point-to-point connection between components, the communication bus 575 may include a PCIe link to carry out the connection. In these examples, a PCI bus need not be included in the system 565.

Figure 5C:
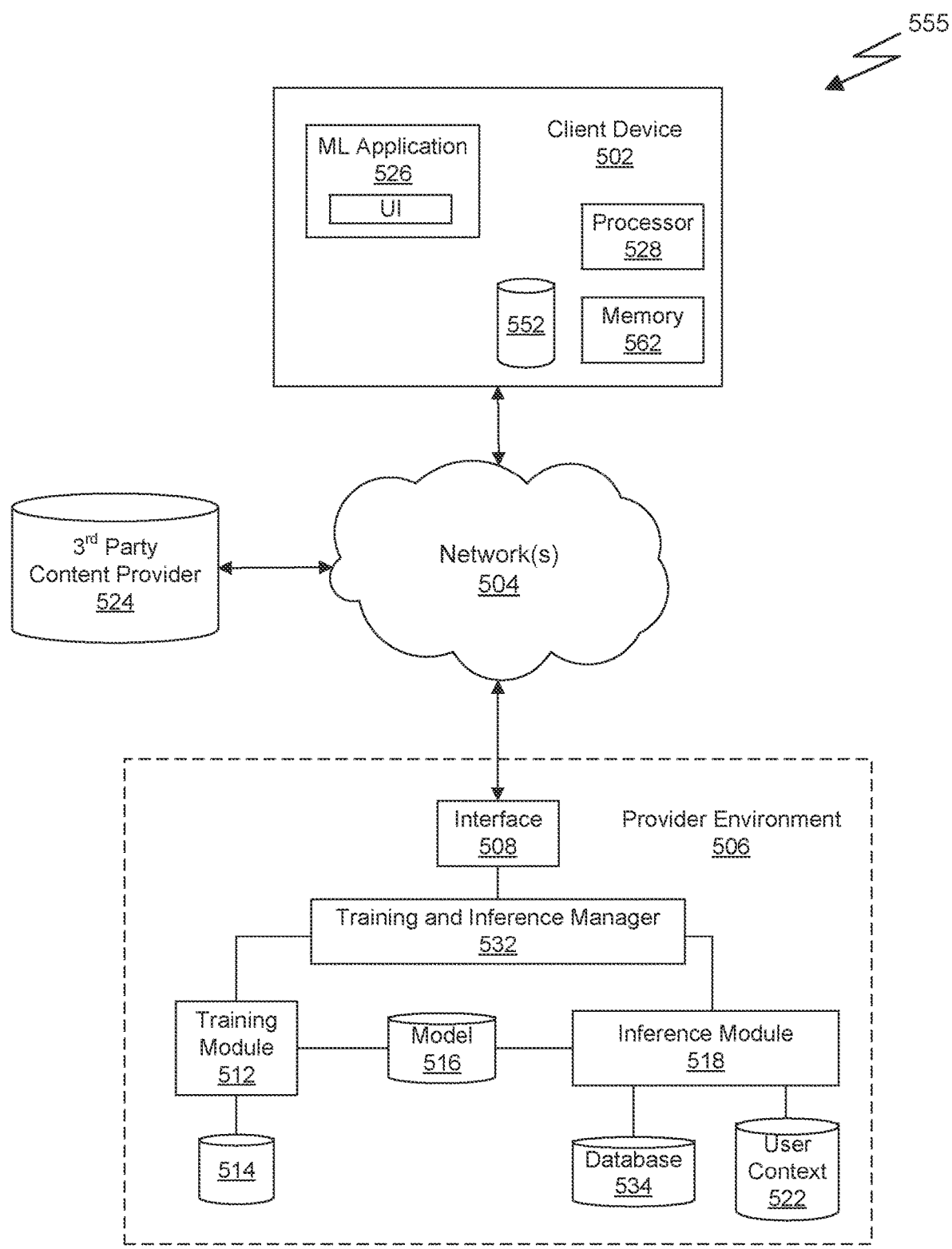
FIG. 5C illustrates components of an exemplary system that can be used to train and utilize machine learning, in at least one embodiment.

Although the various blocks of FIG. 5C are shown as connected via the communication bus 575 with lines, this is not intended to be limiting and is for clarity only. For example, in some embodiments, a presentation component, such as display device(s) 545, may be considered an I/O component, such as input device(s) 560 (e.g., if the display is a touch screen). As another example, the CPU(s) 530 and/or parallel processing system 525 may include memory (e.g., the main memory 540 may be representative of a storage device in addition to the parallel processing system 525, the CPUs 530, and/or other components). In other words, the computing device of FIG. 5C is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5C.

The system 565 also includes a main memory 540. Control logic (software) and data are stored in the main memory 540 which may take the form of a variety of computer-readable media. The computer-readable media may be any available media that may be accessed by the system 565. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the main memory 540 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by system 565. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Computer programs, when executed, enable the system 565 to perform various functions. The CPU(s) 530 may be configured to execute at least some of the computer-readable instructions to control one or more components of the system 565 to perform one or more of the methods and/or processes described herein. The CPU(s) 530 may each include one or more cores (e.g., one, two, four, eight, twenty-eight, seventy-two, etc.) that are capable of handling a multitude of software threads simultaneously. The CPU(s) 530 may include any type of processor, and may include different types of processors depending on the type of system 565 implemented (e.g., processors with fewer cores for mobile devices and processors with more cores for servers). For example, depending on the type of system 565, the processor may be an Advanced RISC Machines (ARM) processor implemented using Reduced Instruction Set Computing (RISC) or an x86 processor implemented using Complex Instruction Set Computing (CISC). The system 565 may include one or more CPUs 530 in addition to one or more microprocessors or supplementary co-processors, such as math co-processors.

In addition to or alternatively from the CPU(s) 530, the parallel processing module 525 may be configured to execute at least some of the computer-readable instructions to control one or more components of the system 565 to perform one or more of the methods and/or processes described herein. The parallel processing module 525 may be used by the system 565 to render graphics (e.g., 3D graphics) or perform general purpose computations. For example, the parallel processing module 525 may be used for General-Purpose computing on GPUs (GPGPU). In embodiments, the CPU(s) 530 and/or the parallel processing module 525 may discretely or jointly perform any combination of the methods, processes and/or portions thereof.

The system 565 also includes input device(s) 560, the parallel processing system 525, and display device(s) 545. The display device(s) 545 may include a display (e.g., a monitor, a touch screen, a television screen, a heads-up-display (UD), other display types, or a combination thereof), speakers, and/or other presentation components. The display device(s) 545 may receive data from other components (e.g., the parallel processing system 525, the CPU(s) 530, etc.), and output the data (e.g., as an image, video, sound, etc.).

The network interface 535 may enable the system 565 to be logically coupled to other devices including the input devices 560, the display device(s) 545, and/or other components, some of which may be built in to (e.g., integrated in) the system 565. Illustrative input devices 560 include a microphone, mouse, keyboard, joystick, game pad, game controller, satellite dish, scanner, printer, wireless device, etc. The input devices 560 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the system 565. The system 565 may be include depth cameras, such as stereoscopic camera systems, infrared camera systems, RGB camera systems, touchscreen technology, and combinations of these, for gesture detection and recognition. Additionally, the system 565 may include accelerometers or gyroscopes (e.g., as part of an inertia measurement unit (IMU)) that enable detection of motion. In some examples, the output of the accelerometers or gyroscopes may be used by the system 565 to render immersive augmented reality or virtual reality.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes. The system 565 may be included within a distributed network and/or cloud computing environment.

The network interface 535 may include one or more receivers, transmitters, and/or transceivers that enable the system 565 to communicate with other computing devices via an electronic communication network, included wired and/or wireless communications. The network interface 535 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. The system 565 may also include a hard-wired power supply, a battery power supply, or a combination thereof (not shown). The power supply may provide power to the system 565 to enable the components of the system 565 to operate.

Each of the foregoing modules and/or devices may even be situated on a single semiconductor platform to form the system 565. Alternately, the various modules may also be situated separately or in various combinations of semiconductor platforms per the desires of the user. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the processing system 500 of FIG. 5A and/or exemplary system 565 of FIG. 5B—e.g., each device may include similar components, features, and/or functionality of the processing system 500 and/or exemplary system 565.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example processing system 500 of FIG. 5B and/or exemplary system 565 of FIG. 5C. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Machine Learning

Deep neural networks (DNNs) developed on processors, such as the PPU 400 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 400. Inferencing is less compute-intensive than training, being a latency-sensitive process where a trained neural network is applied to new inputs it has not seen before to classify images, detect emotions, identify recommendations, recognize and translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 400 is a computing platform capable of delivering performance required for deep neural network-based artificial intelligence and machine learning applications.

Furthermore, images generated applying one or more of the techniques disclosed herein may be used to train, test, or certify DNNs used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

FIG. 5C illustrates components of an exemplary system 555 that can be used to train and utilize machine learning, in accordance with at least one embodiment. As will be discussed, various components can be provided by various combinations of computing devices and resources, or a single computing system, which may be under control of a single entity or multiple entities. Further, aspects may be triggered, initiated, or requested by different entities. In at least one embodiment training of a neural network might be instructed by a provider associated with provider environment 506, while in at least one embodiment training might be requested by a customer or other user having access to a provider environment through a client device 502 or other such resource. In at least one embodiment, training data (or data to be analyzed by a trained neural network) can be provided by a provider, a user, or a third party content provider 524. In at least one embodiment, client device 502 may be a vehicle or object that is to be navigated on behalf of a user, for example, which can submit requests and/or receive instructions that assist in navigation of a device.

In at least one embodiment, requests are able to be submitted across at least one network 504 to be received by a provider environment 506. In at least one embodiment, a client device may be any appropriate electronic and/or computing devices enabling a user to generate and send such requests, such as, but not limited to, desktop computers, notebook computers, computer servers, smartphones, tablet computers, gaming consoles (portable or otherwise), computer processors, computing logic, and set-top boxes. Network(s) 504 can include any appropriate network for transmitting a request or other such data, as may include Internet, an intranet, an Ethernet, a cellular network, a local area network (LAN), a wide area network (WAN), a personal area network (PAN), an ad hoc network of direct wireless connections among peers, and so on.

In at least one embodiment, requests can be received at an interface layer 508, which can forward data to a training and inference manager 532, in this example. The training and inference manager 532 can be a system or service including hardware and software for managing requests and service corresponding data or content, in at least one embodiment, the training and inference manager 532 can receive a request to train a neural network, and can provide data for a request to a training module 512. In at least one embodiment, training module 512 can select an appropriate model or neural network to be used, if not specified by the request, and can train a model using relevant training data. In at least one embodiment, training data can be a batch of data stored in a training data repository 514, received from client device 502, or obtained from a third party provider 524. In at least one embodiment, training module 512 can be responsible for training data. A neural network can be any appropriate network, such as a recurrent neural network (RNN) or convolutional neural network (CNN). Once a neural network is trained and successfully evaluated, a trained neural network can be stored in a model repository 516, for example, that may store different models or networks for users, applications, or services, etc. In at least one embodiment, there may be multiple models for a single application or entity, as may be utilized based on a number of different factors.

In at least one embodiment, at a subsequent point in time, a request may be received from client device 502 (or another such device) for content (e.g., path determinations) or data that is at least partially determined or impacted by a trained neural network. This request can include, for example, input data to be processed using a neural network to obtain one or more inferences or other output values, classifications, or predictions, or for at least one embodiment, input data can be received by interface layer 508 and directed to inference module 518, although a different system or service can be used as well. In at least one embodiment, inference module 518 can obtain an appropriate trained network, such as a trained deep neural network (DNN) as discussed herein, from model repository 516 if not already stored locally to inference module 518. Inference module 518 can provide data as input to a trained network, which can then generate one or more inferences as output. This may include, for example, a classification of an instance of input data. In at least one embodiment, inferences can then be transmitted to client device 502 for display or other communication to a user. In at least one embodiment, context data for a user may also be stored to a user context data repository 522, which may include data about a user which may be useful as input to a network in generating inferences, or determining data to return to a user after obtaining instances. In at least one embodiment, relevant data, which may include at least some of input or inference data, may also be stored to a local database 534 for processing future requests. In at least one embodiment, a user can use account information or other information to access resources or functionality of a provider environment. In at least one embodiment, if permitted and available, user data may also be collected and used to further train models, in order to provide more accurate inferences for future requests. In at least one embodiment, requests may be received through a user interface to a machine learning application 526 executing on client device 502, and results displayed through a same interface. A client device can include resources such as a processor 528 and memory 562 for generating a request and processing results or a response, as well as at least one data storage element 552 for storing data for machine learning application 526.

In at least one embodiment a processor 528 (or a processor of training module 512 or inference module 518) will be a central processing unit (CPU). As mentioned, however, resources in such environments can utilize GPUs to process data for at least certain types of requests. With thousands of cores, GPUs, such as PPU 300 are designed to handle substantial parallel workloads and, therefore, have become popular in deep learning for training neural networks and generating predictions. While use of GPUs for offline builds has enabled faster training of larger and more complex models, generating predictions offline implies that either request-time input features cannot be used or predictions must be generated for all permutations of features and stored in a lookup table to serve real-time requests. If a deep learning framework supports a CPU-mode and a model is small and simple enough to perform a feed-forward on a CPU with a reasonable latency, then a service on a CPU instance could host a model. In this case, training can be done offline on a GPU and inference done in real-time on a CPU. If a CPU approach is not viable, then a service can run on a GPU instance. Because GPUs have different performance and cost characteristics than CPUs, however, running a service that offloads a runtime algorithm to a GPU can require it to be designed differently from a CPU based service.

In at least one embodiment, video data can be provided from client device 502 for enhancement in provider environment 506. In at least one embodiment, video data can be processed for enhancement on client device 502. In at least one embodiment, video data may be streamed from a third party content provider 524 and enhanced by third party content provider 524, provider environment 506, or client device 502. In at least one embodiment, video data can be provided from client device 502 for use as training data in provider environment 506.

In at least one embodiment, supervised and/or unsupervised training can be performed by the client device 502 and/or the provider environment 506. In at least one embodiment, a set of training data 514 (e.g., classified or labeled data) is provided as input to function as training data. In an embodiment, the set of training data may be used in a generative adversarial training configuration to train a generator neural network.

In at least one embodiment, training data can include images of at least one human subject, avatar, or character for which a neural network is to be trained. In at least one embodiment, training data can include instances of at least one type of object for which a neural network is to be trained, as well as information that identifies that type of object. In at least one embodiment, training data might include a set of images that each includes a representation of a type of object, where each image also includes, or is associated with, a label, metadata, classification, or other piece of information identifying a type of object represented in a respective image. Various other types of data may be used as training data as well, as may include text data, audio data, video data, and so on. In at least one embodiment, training data 514 is provided as training input to a training module 512. In at least one embodiment, training module 512 can be a system or service that includes hardware and software, such as one or more computing devices executing a training application, for training a neural network (or other model or algorithm, etc.). In at least one embodiment, training module 512 receives an instruction or request indicating a type of model to be used for training, in at least one embodiment, a model can be any appropriate statistical model, network, or algorithm useful for such purposes, as may include an artificial neural network, deep learning algorithm, learning classifier, Bayesian network, and so on. In at least one embodiment, training module 512 can select an initial model, or other untrained model, from an appropriate repository 516 and utilize training data 514 to train a model, thereby generating a trained model (e.g., trained deep neural network) that can be used to classify similar types of data, or generate other such inferences. In at least one embodiment where training data is not used, an appropriate initial model can still be selected for training on input data per training module 512.

In at least one embodiment, a model can be trained in a number of different ways, as may depend in part upon a type of model selected. In at least one embodiment, a machine learning algorithm can be provided with a set of training data, where a model is a model artifact created by a training process. In at least one embodiment, each instance of training data contains a correct answer (e.g., classification), which can be referred to as a target or target attribute. In at least one embodiment, a learning algorithm finds patterns in training data that map input data attributes to a target, an answer to be predicted, and a machine learning model is output that captures these patterns. In at least one embodiment, a machine learning model can then be used to obtain predictions on new data for which a target is not specified.

In at least one embodiment, training and inference manager 532 can select from a set of machine learning models including binary classification, multiclass classification, generative, and regression models. In at least one embodiment, a type of model to be used can depend at least in part upon a type of target to be predicted.

Graphics Processing Pipeline

In an embodiment, the PPU 400 comprises a graphics processing unit (GPU). The PPU 400 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 400 can be configured to process the graphics primitives to generate a frame buffer (e.g., pixel data for each of the pixels of the display).

An application writes model data for a scene (e.g., a collection of vertices and attributes) to a memory such as a system memory or memory 404. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the processing units within the PPU 400 including one or more of a vertex shader, hull shader, domain shader, geometry shader, and a pixel shader. For example, one or more of the processing units may be configured to execute a vertex shader program that processes a number of vertices defined by the model data. In an embodiment, the different processing units may be configured to execute different shader programs concurrently. For example, a first subset of processing units may be configured to execute a vertex shader program while a second subset of processing units may be configured to execute a pixel shader program. The first subset of processing units processes vertex data to produce processed vertex data and writes the processed vertex data to the L2 cache 460 and/or the memory 404. After the processed vertex data is rasterized (e.g., transformed from three-dimensional data into two-dimensional data in screen space) to produce fragment data, the second subset of processing units executes a pixel shader to produce processed fragment data, which is then blended with other processed fragment data and written to the frame buffer in memory 404. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 6A:
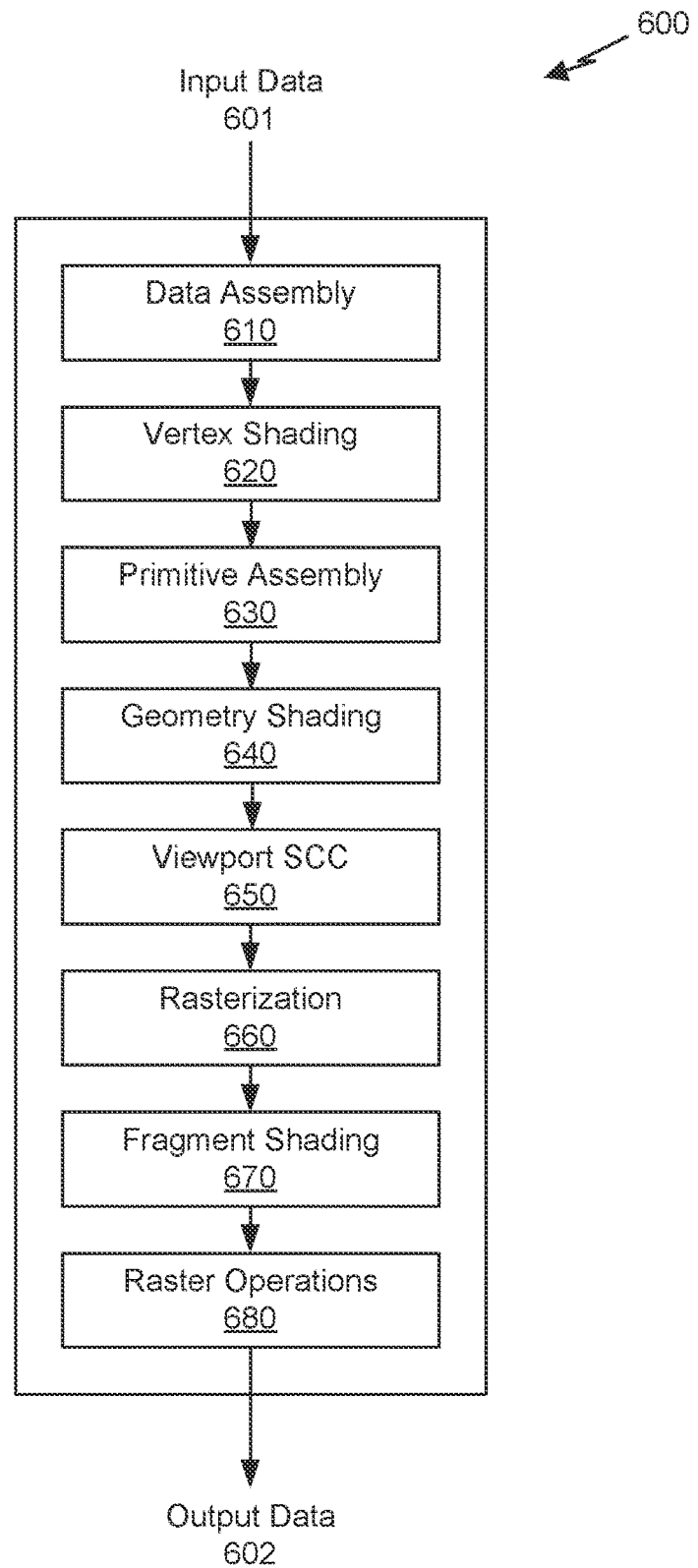
FIG. 6A is a conceptual diagram of a graphics processing pipeline implemented by the PPU of FIG. 4 suitable for use in implementing some embodiments of the present disclosure.

FIG. 6A is a conceptual diagram of a graphics processing pipeline 600 implemented by the PPU 400 of FIG. 4, in accordance with an embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In an embodiment, the graphics processing pipeline 600 may represent a graphics processing pipeline defined by the OpenGL© API. As an option, the graphics processing pipeline 600 may be implemented in the context of the functionality and architecture of the previous Figures and/or any subsequent Figure(s).

As shown in FIG. 6A, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In an embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (e.g., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (e.g., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (e.g., a collection of associated vertices) to the geometry shading stage 640.

The geometry shading stage 640 processes geometric primitives by performing a set of operations (e.g., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In an embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in an embodiment, the viewport SCC stage 650 may utilize the data. In an embodiment, primitive data processed by one or more of the stages in the graphics processing pipeline 600 may be written to a cache (e.g. L1 cache, a vertex cache, etc.). In this case, in an embodiment, the viewport SCC stage 650 may access the data in the cache. In an embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 660 generates fragment data (e.g., interpolated vertex attributes associated with a particular sample location for each covered pixel) that are transmitted to the fragment shading stage 670.

The fragment shading stage 670 processes fragment data by performing a set of operations (e.g., a fragment shader or a program) on each of the fragments. The fragment shading stage 670 may generate pixel data (e.g., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (e.g., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 400. Other stages of the graphics processing pipeline 600 may be implemented by programmable hardware units such as the processing unit within the PPU 400.

The graphics processing pipeline 600 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 400. The API provides an abstraction for a programmer that lets a programmer utilize specialized graphics hardware, such as the PPU 400, to generate the graphical data without requiring the programmer to utilize the specific instruction set for the PPU 400. The application may include an API call that is routed to the device driver for the PPU 400. The device driver interprets the API call and performs various operations to respond to the API call. In some instances, the device driver may perform operations by executing instructions on the CPU. In other instances, the device driver may perform operations, at least in part, by launching operations on the PPU 400 utilizing an input/output interface between the CPU and the PPU 400. In an embodiment, the device driver is configured to implement the graphics processing pipeline 600 utilizing the hardware of the PPU 400.

Various programs may be executed within the PPU 400 in order to implement the various stages of the graphics processing pipeline 600. For example, the device driver may launch a kernel on the PPU 400 to perform the vertex shading stage 620 on one processing unit (or multiple processing units). The device driver (or the initial kernel executed by the PPU 400) may also launch other kernels on the PPU 400 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 400. It will be appreciated that results from one kernel may be processed by one or more intervening fixed function hardware units before being processed by a subsequent kernel on a processing unit.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server, a data center, or in a cloud-based computing environment and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA GeForce Now (GFN), Google Stadia, and the like.

Example Game Streaming System

Figure 6B:
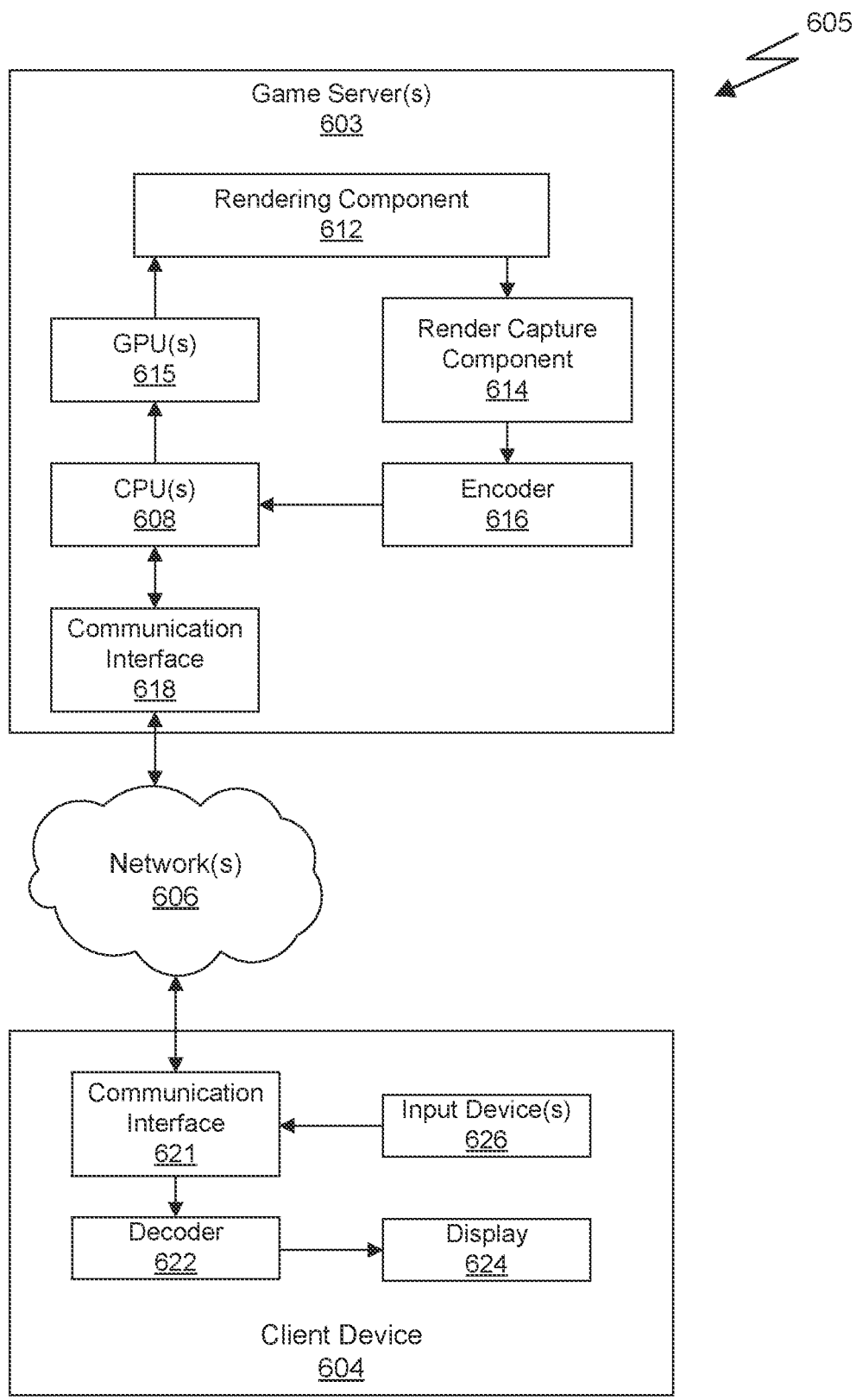
FIG. 6B illustrates an exemplary game streaming system suitable for use in implementing some embodiments of the present disclosure.

FIG. 6B is an example system diagram for a game streaming system 605, in accordance with some embodiments of the present disclosure. FIG. 6B includes game server(s) 603 (which may include similar components, features, and/or functionality to the example processing system 500 of FIG. 5A and/or exemplary system 565 of FIG. 5B), client device(s) 604 (which may include similar components, features, and/or functionality to the example processing system 500 of FIG. 5A and/or exemplary system 565 of FIG. 5B), and network(s) 606 (which may be similar to the network(s) described herein). In some embodiments of the present disclosure, the system 605 may be implemented.

In the system 605, for a game session, the client device(s) 604 may only receive input data in response to inputs to the input device(s), transmit the input data to the game server(s) 603, receive encoded display data from the game server(s) 603, and display the display data on the display 624. As such, the more computationally intense computing and processing is offloaded to the game server(s) 603 (e.g., rendering—in particular ray or path tracing—for graphical output of the game session is executed by the GPU(s) of the game server(s) 603). In other words, the game session is streamed to the client device(s) 604 from the game server(s) 603, thereby reducing the requirements of the client device(s) 604 for graphics processing and rendering.

For example, with respect to an instantiation of a game session, a client device 604 may be displaying a frame of the game session on the display 624 based on receiving the display data from the game server(s) 603. The client device 604 may receive an input to one of the input device(s) and generate input data in response. The client device 604 may transmit the input data to the game server(s) 603 via the communication interface 621 and over the network(s) 606 (e.g., the Internet), and the game server(s) 603 may receive the input data via the communication interface 618. The CPU(s) may receive the input data, process the input data, and transmit data to the GPU(s) that causes the GPU(s) to generate a rendering of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include ray or path-traced lighting and/or shadow effects, computed using one or more parallel processing units—such as GPUs, which may further employ the use of one or more dedicated hardware accelerators or processing cores to perform ray or path-tracing techniques—of the game server(s) 603. The encoder 616 may then encode the display data to generate encoded display data and the encoded display data may be transmitted to the client device 604 over the network(s) 606 via the communication interface 618. The client device 604 may receive the encoded display data via the communication interface 621 and the decoder 622 may decode the encoded display data to generate the display data. The client device 604 may then display the display data via the display 624.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A computer-implemented method, comprising:
   determining a spherical polygon on a unit hemisphere;
   determining, on a unit circle, a projected area corresponding to the spherical polygon on the unit hemisphere, wherein the unit circle is a base of the unit hemisphere, and wherein projection of the projected area is along a vector perpendicular to the unit circle;
   determining a parameterization of the projected area of the spherical polygon on the unit circle;
   generating samples in the projected area based on the parameterization according to a uniform distribution in the projected area; and
   generating samples in the spherical polygon in a weighted cosine distribution, wherein the generated samples in the spherical polygon correspond to the samples in the projected area.

2. The method according to claim 1, wherein an origin of the unit hemisphere is a point on a surface of an object, and wherein the base of the unit hemisphere is perpendicular to a surface normal of the point on the surface of the object.

3. The method according to claim 1, wherein the spherical polygon on the unit hemisphere is determined by intercepting rays from a polygonal area light with the unit hemisphere, and
   wherein the rays are determined by connecting vertices of the polygonal area light to the origin of the unit hemisphere.

4. The method according to claim 3, wherein the polygonal area light is partially below a horizon of the unit hemisphere, the method further comprising:
   clipping the polygonal area light at the horizon of the unit hemisphere; and
   dividing the clipped polygonal area light to generate a number of triangles.

5. The method according to claim 1, wherein the projected area of the spherical polygon on the unit circle is bounded by a set of ellipses,
   wherein the set of ellipses share an origin at the origin of the unit circle, and
   wherein the set of ellipses corresponds to a set of great circles on the unit hemisphere.

6. The method according to claim 1, further comprising:
   evaluating a rendering equation based on the generated samples in the spherical polygon.

7. The method according to claim 6, wherein the spherical polygon is transformed from an original space based on a linearly transformed cosines (LTC) matrix, the method further comprising:
   transforming the generated samples in the spherical polygon back to the original space based on the LTC matrix.

8. A computer-implemented method, comprising:
   generating a sample in a spherical polygon located on a unit hemisphere;
   checking the sample against an acceptance criterion, wherein the acceptance criterion comprises an acceptance probability related to a height of the sample on the unit hemisphere along a vector perpendicular to a unit circle as a base of the unit hemisphere relative to a maximum height of the spherical polygon on the unit hemisphere along the vector perpendicular to the unit circle;
   in response to the sample meeting the acceptance criterion, adding the sample to a set of samples; or in response to the sample not meeting the acceptance criterion, rejecting the sample; and generating an image based on the set of samples.

9. The method according to claim 8, wherein the acceptance criterion is met responsive to determining that a randomly or pseudo randomly generated value is greater than or equal to the acceptance probability.

10. The method according to claim 8, wherein the sample is generated in accordance with a uniform distribution on the unit hemisphere.

11. The method according to claim 8, wherein a pole of the unit hemisphere is not included in the spherical polygon, the method further comprising:
determining the maximum height of the spherical polygon among vertices and edges of the spherical polygon.

12. The method according to claim 8, further comprising:
evaluating a rendering equation based on the set of samples in the spherical polygon.

13. A system, comprising:
one or more processors; and
a memory storing instructions that, responsive to execution by the one or more processors, cause the system to:
determine a spherical polygon on a unit hemisphere;
determine, on a unit circle, a projected area corresponding to the spherical polygon on the unit hemisphere, wherein the unit circle is a base of the unit hemisphere, and wherein projection of the projected area is along a vector perpendicular to the unit circle;
determine a parameterization of the projected area of the spherical polygon on the unit circle;
generate samples in the projected area based on the parameterization according to a uniform distribution in the projected area; and
generate samples in the spherical polygon in a weighted cosine distribution, wherein the generated samples in the spherical polygon correspond to the samples in the projected area.

14. The system according to claim 13, wherein an origin of the unit hemisphere is a point on a surface of an object, and wherein the base of the unit hemisphere is perpendicular to a surface normal of the point on the surface of the object.

15. The system according to claim 13, wherein the spherical polygon on the unit hemisphere is determined by intercepting rays from a polygonal area light with the unit hemisphere, and wherein the rays are determined by connecting vertices of the polygonal area light to the origin of the unit hemisphere.

16. The system according to claim 15, wherein the polygonal area light is partially below a horizon of the unit hemisphere, and wherein the instructions further cause the system to:
clip the polygonal area light at the horizon of the unit hemisphere; and
divide the clipped polygonal area light to generate a number of triangles.

17. The system according to claim 13, wherein the projected area of the spherical polygon on the unit circle is bounded by a set of ellipses;
wherein the set of ellipses share an origin at the origin of the unit circle, and
wherein the set of ellipses corresponds to a set of great circles on the unit hemisphere.

18. The system according to claim 13, wherein the instructions further cause the system to:
evaluate a rendering equation based on the generated samples in the spherical polygon.

19. The system according to claim 18, wherein the spherical polygon is transformed from an original space based on a linearly transformed cosines (LTC) matrix, and wherein the instructions further cause the system to:
transform the generated samples in the spherical polygon back to the original space based on the LTC matrix.

20. A non-transitory computer readable medium storing instructions that, responsive to execution by one or more processors, cause a system to implement the method according to claim 1.

* * * * *